(12) United States Patent
Li et al.

(10) Patent No.: US 9,317,751 B2
(45) Date of Patent: Apr. 19, 2016

(54) VIDEO PROCESSING SYSTEM WITH VIDEO TO TEXT DESCRIPTION GENERATION, SEARCH SYSTEM AND METHODS FOR USE THEREWITH

(75) Inventors: Ying Li, Richmond Hill (CA); Xu Gang (Wilf) Zhao, Maple (CA)

(73) Assignee: ViXS Systems, Inc., Toronto (CA)

( * ) Notice: Subject to any disclaimer, the term of this patent is extended or adjusted under 35 U.S.C. 154(b) by 422 days.

(21) Appl. No.: 13/467,691

(22) Filed: May 9, 2012

(65) Prior Publication Data

US 2013/0279603 A1 Oct. 24, 2013

Related U.S. Application Data

(60) Provisional application No. 61/635,034, filed on Apr. 18, 2012.

(51) Int. Cl.
*H04N 19/103* (2014.01)
*G06K 9/00* (2006.01)
*H04N 19/152* (2014.01)
*H04N 19/17* (2014.01)

(52) U.S. Cl.
CPC .......... *G06K 9/00724* (2013.01); *H04N 19/103* (2014.11); *H04N 19/152* (2014.11); *H04N 19/17* (2014.11)

(58) Field of Classification Search
CPC .......... G06K 9/00724; G06K 9/00751; G06K 9/00711; G06K 9/00744; G06K 9/00765; G06F 17/3002; G06F 17/30321; G06F 17/30858
USPC ....................................................... 375/240.26
See application file for complete search history.

(56) References Cited

U.S. PATENT DOCUMENTS

| | | | |
|---|---|---|---|
| 8,019,175 B2 * | 9/2011 | Lee .......................... | H04N 7/147 348/14.01 |
| 2008/0193016 A1 * | 8/2008 | Lim .................. | G06F 17/30787 382/190 |

* cited by examiner

*Primary Examiner* — Andy Rao
*Assistant Examiner* — Obafemi Sosanya
(74) *Attorney, Agent, or Firm* — Garlick & Markison; Bruce E. Stuckman

(57) ABSTRACT

A system for searching at least one video signal based on an input text string includes a video processing system that processes the at least one video signal by decoding the at least one video signal, encoding the at least one video signal or transcoding the at least one video signal. The video processing system generates a plurality of text strings that describe the video signal in conjunction with the processing. A memory stores a searchable index that includes the plurality of text strings. A search module identifies at least one matching video of the at least one video signal by comparing the input text string to the plurality of text strings of the searchable index.

15 Claims, 20 Drawing Sheets

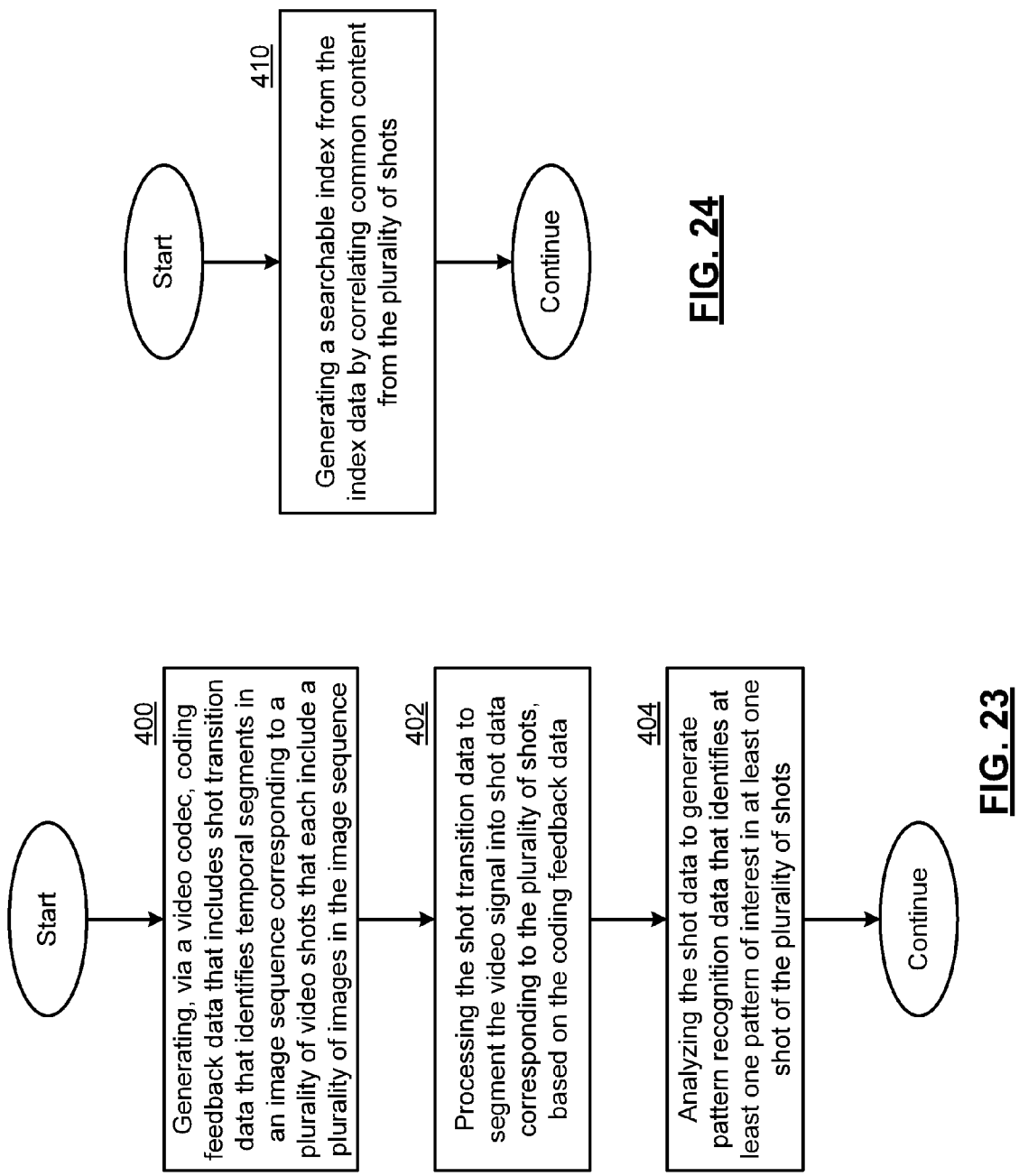

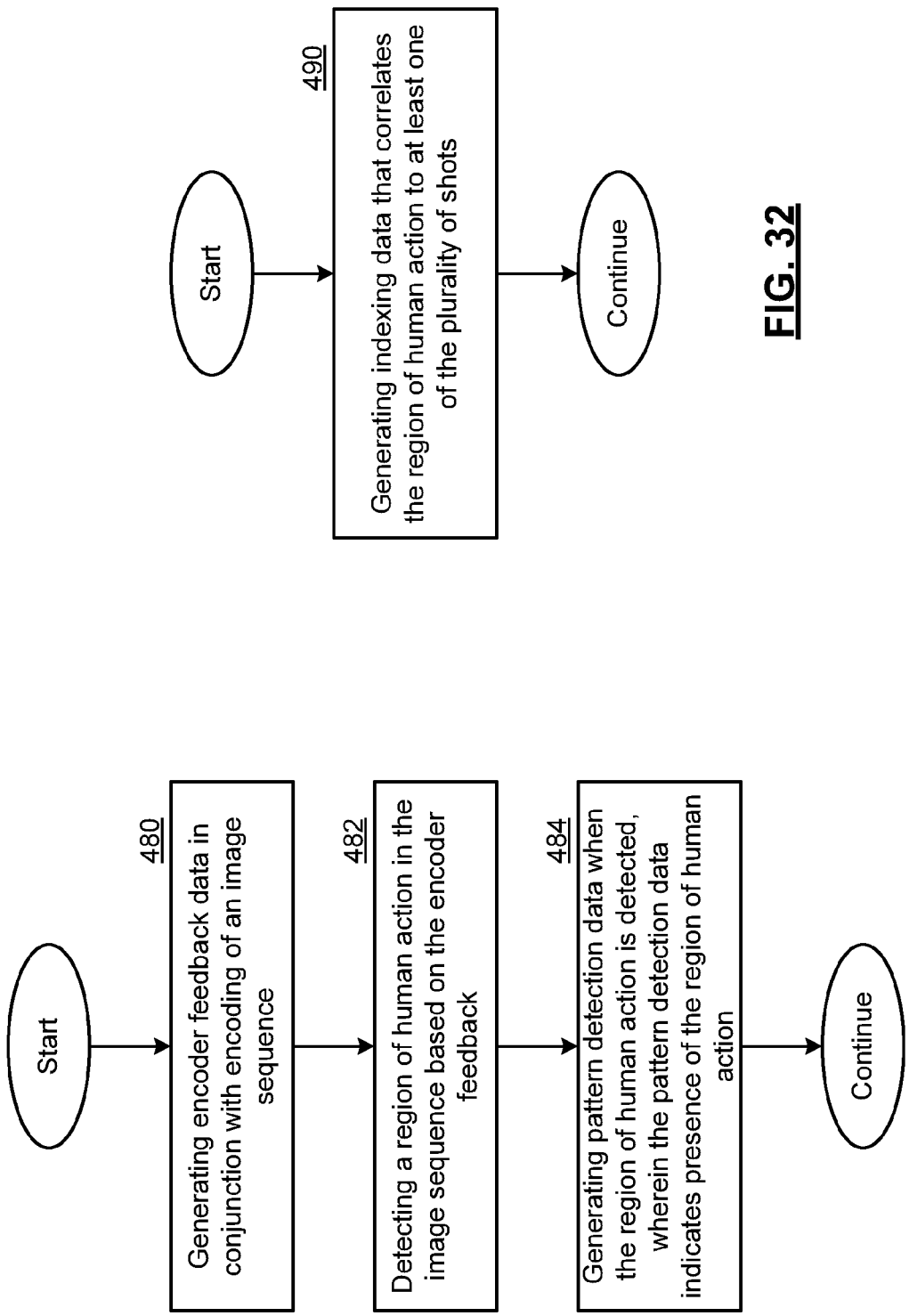

VIDEO PROCESSING SYSTEM WITH VIDEO TO TEXT DESCRIPTION GENERATION, SEARCH SYSTEM AND METHODS FOR USE THEREWITH

CROSS REFERENCE TO RELATED PATENTS

The present application claims priority under 35 USC 119 (e) to the provisionally filed U.S. Application entitled, VIDEO PROCESSING SYSTEM WITH PATTERN DETECTION AND METHODS FOR USE THEREWITH, having Ser. No. 61/635,034, and filed on Apr. 18, 2012, the contents of which are expressly incorporated herein in its entirety by reference thereto.

TECHNICAL FIELD OF THE INVENTION

The present invention relates to coding used in devices such as video encoders/decoders.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to higher resolution and better picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. Video encoding can be a computationally complex task for high resolution video signals requiring large amounts of computations and storage.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 23 presents a flowchart representation of a method in accordance with an embodiment of the present invention.

FIG. 24 presents a flowchart representation of a method in accordance with an embodiment of the present invention.

FIG. 31 presents a flowchart representation of a method in accordance with an embodiment of the present invention.

FIG. 32 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
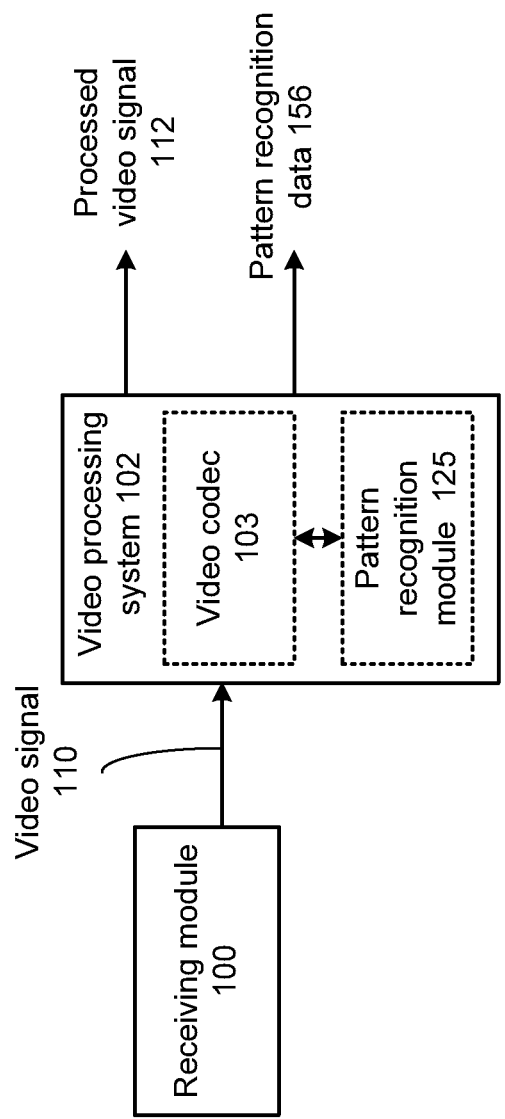
FIG. 1 presents a block diagram representation of a video processing system 102 in accordance with an embodiment of the present invention.

FIG. 1 presents a block diagram representation of a video processing system 102 in accordance with an embodiment of the present invention. In particular, a video processing system 102 includes both a video codec 103 and a pattern recognition module 125. Video encoding/decoding and pattern recognition are both computational complex tasks, especially when performed on high resolution videos. Some temporal and spatial information, such as motion vectors and statistical information of blocks and shot segmentation are useful for both tasks. So if the two tasks are developed together, they can share information and economize on the efforts needed to implement these tasks.

In particular, a video system includes a receiving module 100, such as a video server, set-top box, television receiver, personal computer, cable television receiver, satellite broadcast receiver, broadband modem, 3G transceiver, network node, cable headend or other information receiver or transceiver that is capable of receiving one or more video signals 110 from one or more sources such as video content providers, a broadcast cable system, a broadcast satellite system, the Internet, a digital video disc player, a digital video recorder, or other video source. Video processing system 102 is coupled to the receiving module 100 to encode, decode and/or transcode one or more of the video signals 110 to form processed video signal 112 via the operation of video codec 103.

In an embodiment of the present invention, the video signals 110 can include a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, the video signals 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 and processed video signal 112 can each be differing ones of an analog audio/video (A/V) signal that is formatted in any of a number of analog video formats including National Television Systems Committee (NTSC), Phase Alternating Line (PAL) or Sequentiel Couleur Avec Memoire (SECAM). The video signal 110 and/or processed video signal 112 can each be a digital audio/video signal in an uncompressed digital audio/video format such as high-definition multimedia interface (HDMI) formatted data, International Telecommunications Union recommendation BT.656 formatted data, inter-integrated circuit sound (I2S) formatted data, and/or other digital A/V data formats.

The video signal 110 and/or processed video signal 112 can each be a digital video signal in a compressed digital video format such as H.264, MPEG-4 Part 10 Advanced Video Coding (AVC) or other digital format such as a Moving Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary. When video signal 110 is received as digital video and/or processed video signal 112 is produced in a digital video format, the digital video signal may be optionally encrypted, may include corresponding audio and may be formatted for transport via one or more container formats.

Examples of such container formats are encrypted Internet Protocol (IP) packets such as used in IP TV, Digital Transmission Content Protection (DTCP), etc. In this case the payload of IP packets contain several transport stream (TS) packets and the entire payload of the IP packet is encrypted. Other examples of container formats include encrypted TS streams used in Satellite/Cable Broadcast, etc. In these cases, the payload of TS packets contain packetized elementary stream (PES) packets. Further, digital video discs (DVDs) and Blu-Ray Discs (BDs) utilize PES streams where the payload of each PES packet is encrypted.

In operation, video codec 103 encodes, decodes or transcodes the video signal 110 into a processed video signal 112. The pattern recognition module 125 operates cooperatively with the video codec 103, in parallel or in tandem, and based on feedback data from the video codec 103 generated in conjunction with the encoding, decoding or transcoding of the video signal 110. The pattern recognition module 125 processes image sequences in the video signal 110 to detect patterns of interest. When one or more patterns of interest are detected, the pattern recognition module 125 generates pattern recognition data 156, in response, that indicates the pattern or patterns of interest. The pattern recognition data can take the form of data that identifies patterns and corresponding features, like color, shape, size information, number and motion, the recognition of objects or features, as well as the location of these patterns or features in regions of particular images of an image sequence as well as the particular images in the sequence that contain these particular objects or features.

The feedback generated by the video codec 103 can take on many different forms. For example, while temporal and spatial information is used by video codec 103 to remove redundancy, this information can also be used by pattern recognition module 125 to detect or recognize features like sky, grass, sea, wall, buildings and building features such as the type of building, the number of building stories, etc., moving vehicles and animals (including people). Temporal feedback in the form of motion vectors estimated in encoding or retrieved in decoding (or motion information gotten by optical flow for very low resolution) can be used by pattern recognition module 125 for motion-based pattern partition or recognition via a variety of moving group algorithms. In addition, temporal information can be used by pattern recognition module 125 to improve recognition by temporal noise filtering, providing multiple picture candidates to be selected from for recognition of the best image in an image sequence, as well as for recognition of temporal features over a sequence of images. Spatial information such as statistical information, like variance, frequency components and bit consumption estimated from input YUV or retrieved for input streams, can be used for texture based pattern partition and recognition by a variety of different classifiers. More recognition features, like structure, texture, color and motion characters can be used for precise pattern partition and recognition. For instance, line structures can be used to identify and characterize manmade objects such as building and vehicles. Random motion, rigid motion and relative position motion are effective to discriminate water, vehicles and animal respectively. Shot transition information from encoding or decoding that identifies transitions between video shots in an image sequence can be used to start new pattern detecting and reorganization and provide points of demarcation for temporal recognition across a plurality of images.

In addition, feedback from the pattern recognition module 125 can be used to guide the encoding or transcoding performed by video codec 103. After pattern recognition, more specific structural and statistically information can be retrieved that can guide mode decision and rate control to improve quality and performance in encoding or transcoding of the video signal 110. Pattern recognition can also generate feedback that identifies regions with different characteristics. These more contextually correct and grouped motion vectors can improve quality and save bits for encoding, especially in low bit rate cases. After pattern recognition, estimated motion vectors can be grouped and processed in accordance with the feedback. In particular, pattern recognition feedback can be used by video codec 103 for bit allocation in different regions of an image or image sequence in encoding or transcoding of the video signal 110. With pattern recognition and the codec running together, they can provide powerful aids to each other.

The video processing system 102 can be implemented in conjunction with many optional functions and features described in conjunction with FIGS. 2-34 that follow.

Figure 2:
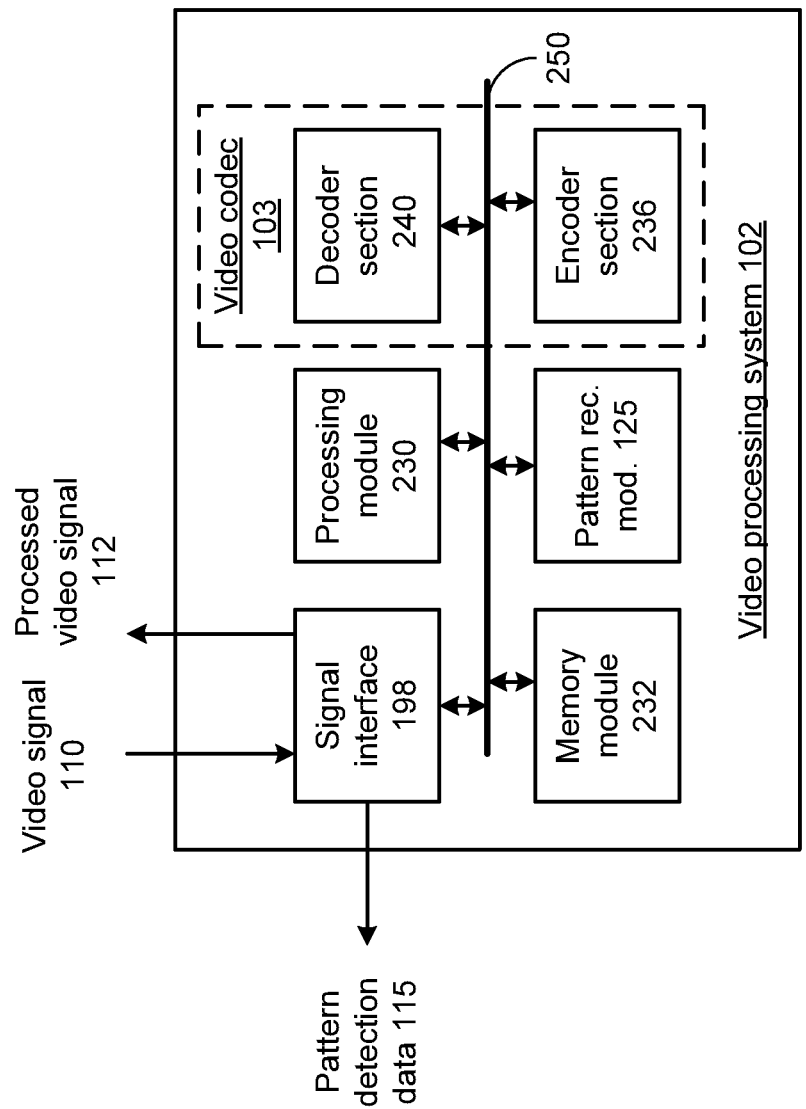
FIG. 2 presents a block diagram representation of a video processing system 102 in accordance with an embodiment of the present invention.

FIG. 2 presents a block diagram representation of a video processing system 102 in accordance with an embodiment of the present invention. In particular, video processing system 102 includes a video codec 103 having decoder section 240 and encoder section 236 that operates in accordance with many of the functions and features of the H.264 standard, the MPEG-4 standard, VC-1 (SMPTE standard 421M) or other standard, to decode, encode, transrate or transcode video input signals 110 that are received via a signal interface 198 to generate the processed video signal 112. In conjunction with the encoding, decoding and/or transcoding of the video signal 110, the video codec 103 generates or retrieves the decoded image sequence of the content of video signal 110 along with coding feedback for transfer to the pattern recognition module 125. The pattern recognition module 125 operates based on an image sequence to generate pattern recognition data 156 and pattern recognition feedback for transfer back to the video codec 103. In particular, pattern recognition module 125 can operate via clustering, statistical pattern recognition, syntactic pattern recognition or via other pattern detection algorithms or methodologies to detect a pattern of interest in an image or image sequence (frame or field) of video signal 110 and generate pattern recognition data 156 in response thereto.

The processing module 230 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 232. Memory module 232 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 230 and memory module 232 are coupled, via bus 250, to the signal interface 198 and a plurality of other modules, such as pattern recognition module 125, decoder section 240 and encoder section 236. In an embodiment of the present invention, the signal interface 198, video codec 103 and pattern recognition module 125 each operate in conjunction with the processing module 230 and memory module 232. The modules of video processing module 102 can each be implemented in software, firmware or hardware, depending on the particular implementation of processing module 230. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Figure 3:
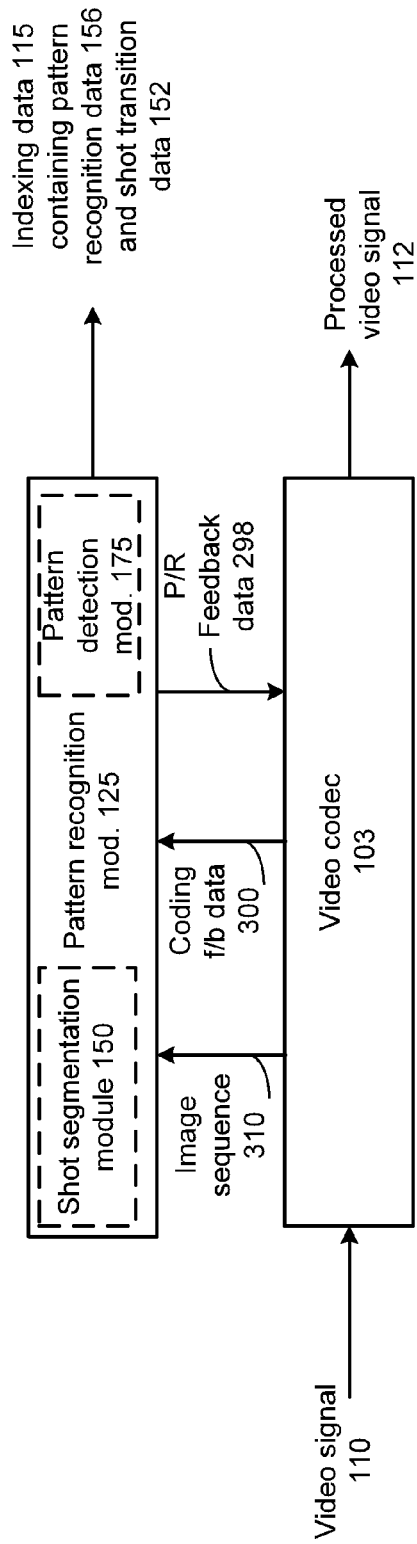
FIG. 3 presents a block diagram representation of a video processing system 102 in accordance with an embodiment of the present invention.

FIG. 3 presents a block diagram representation of a video processing system 102 in accordance with an embodiment of the present invention. As previously discussed, the video codec 103 generates the processed video signal 112 based on the video signal, retrieves or generates image sequence 310 and further generates coding feedback data 300. While the coding feedback data 300 can include other temporal or spatial encoding information, the coding feedback data 300 includes shot transition data that identifies temporal segments in the image sequence corresponding to a plurality of video shots that each include a plurality of images in the image sequence 310.

The pattern recognition module 125 includes a shot segmentation module 150 that segments the image sequence 310 into shot data 154 corresponding to the plurality of shots, based on the coding feedback data 300. A pattern detection module 175 analyzes the shot data 154 and generates pattern recognition data 156 that identifies at least one pattern of interest in conjunction with at least one of the plurality of shots.

In an embodiment, the shot segmentation module 150 operates based on coding feedback 300 that includes shot transition data 152 generated, for example, by preprocessing information, like variance and downscaled motion cost in encoding; and based on reference and bit consumption information in decoding. Shot transition data 152 can not only be included in coding feedback 300, but also generated by video codec 103 for use in GOP structure decision, mode selection and rate control to improve quality and performance in encoding.

For example, encoding preprocessing information, like variance and downscaled motion cost, can be used for shot segmentation. Based on their historical tracks, if variance and downscaled motion cost change dramatically, an abrupt shot transitions happens; when variances keep changing monotonously and motion costs jump up and down at the start and end points of the monotonous variance changes, there is a gradual shot transition, like fade-in, fade-out, dissolve, and wipe. In decoding, frame reference information and bit consumption can be used similarly. The output shot transition data 152 can be used not only for GOP structure decision, mode selection and rate control to improve quality and performance in encoding, but also for temporal segmentation of the image sequence 310 and as an enabler for frame-rate invariant shot level searching features.

Index data 115 can include a text string that identifies a pattern of interest for use in video storage and retrieval, and particularly to find videos of interest (e.g. relating to sports or cooking), locate videos containing certain scenes (e.g. a man and a woman on a beach), certain subject matter (e.g. regarding the American Civil War), certain venues (e.g. the Eiffel Tower) certain objects (e.g. a Patek Phillipe watch), certain themes (e.g. romance, action, horror), etc. Video indexing can be subdivided into five steps: modeling based on domain-specific attributes, segmentation, extraction, representation, organization. Some functions, like shot (temporally and visually connected frames) and scene (temporally and contextually connected shots) segmentation, used in encoding can likewise be used in visual indexing.

In operation, the pattern detection module 175 operates via clustering, statistical pattern recognition, syntactic pattern recognition or via other pattern detection algorithms or methodologies to detect a pattern of interest in an image or image sequence 310 and generates pattern recognition data 156 in response thereto. In this fashion, object/features in each shot can be correlated to the shots that contain these objects and features that can be used for indexing and search of indexed video for key objects/features and the shots that contain these objects/features. The indexing data 115 can be used for scene segmentation in a server, set-top box or other video processing system based on the extracted information and algorithms such as a hidden Markov model (HMM) algorithm that is based on a priori field knowledge.

Consider an example where video signal 110 contains a video broadcast. Index data 115 that indicates anchor shots and field shots show alternately could indicate a news broadcast; crowd shots and sports shots shown alternately could indicate a sporting event. Scene information can also be used for rate control, like quantization parameter (QP) initialization at shot transition in encoding. Index data 115 can be used to generate more high-level motive and contextual descriptions via manual review by human personnel. For instance, based on results mentioned above, operators could process index data 115 to provide additional descriptors for an image sequence 310 to, for example, describe an image sequence as "around 10 people (Adam, Brian . . . ) watching a live Elton John show on grass under the sky in the Queen's Park."

The indexing data 115 can contain pattern recognition data 156 and other hierarchical indexing information like: frame-level temporal and spatial information including variance, global motion and bit number etc.; shot-level objects and text string or other descriptions of features such as text regions of a video, human and action description, object information and background texture description etc.; scene-level represents such as video category (news cast, sitcom, commercials, movie, sports or documentary etc.), and high-level context-level descriptions and presentations presented as text strings, numerical classifiers or other data descriptors.

In addition, pattern recognition feedback 298 in the form of pattern recognition data 156 or other feedback from the pattern recognition module 125 can be used to guide the encoding or transcoding performed by video codec 103. After pattern recognition, more specific structural and statistically information can be generated as pattern recognition feedback 298 that can, for instance, guide mode decision and rate control to improve quality and performance in encoding or transcoding of the video signal 110. Pattern recognition module 125 can also generate pattern recognition feedback 296 that identifies regions with different characteristics. These more contextually correct and grouped motion vectors can improve quality and save bits for encoding, especially in low bit rate cases. After pattern recognition, estimated motion vectors can be grouped and processed in accordance with the pattern recognition feedback 298. In particular, the pattern recognition feedback 298 can be used by video codec 103 for bit allocation in different regions of an image or image sequence in encoding or transcoding of the video signal 110.

Figure 4:
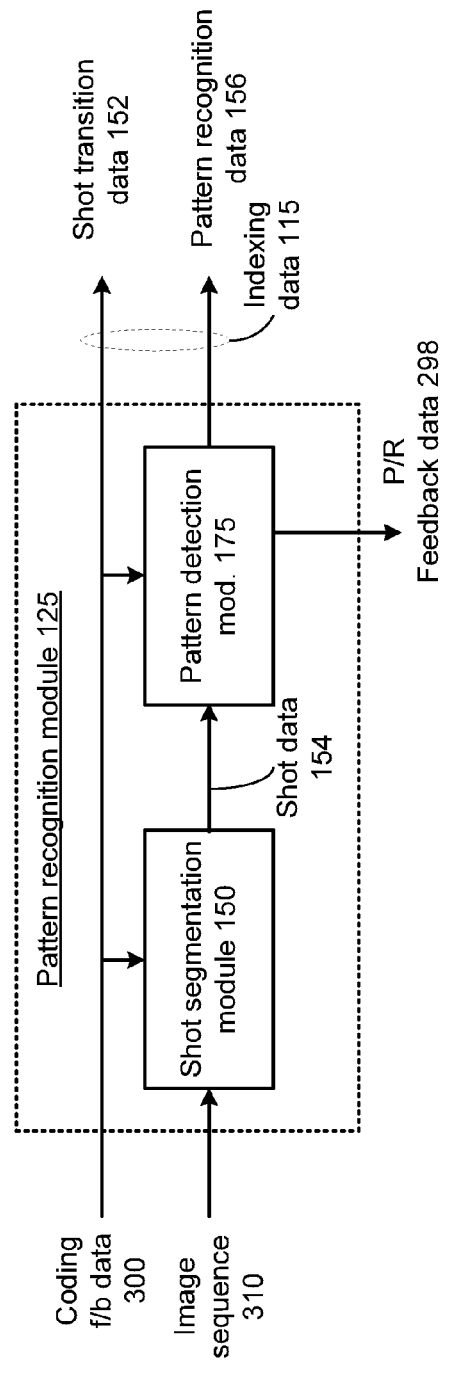
FIG. 4 presents a block diagram representation of a pattern recognition module 125 in accordance with a further embodiment of the present invention.

FIG. 4 presents a block diagram representation of a pattern recognition module 125 in accordance with a further embodiment of the present invention. As shown, the pattern recognition module 125 includes a shot segmentation module 150 that segments an image sequence 310 into shot data 154 corresponding to a plurality of shots, based on the coding feedback data 300, such as shot transition data 152. The pattern detection module 175 analyzes the shot data 154 and generates pattern recognition data 156 that identifies at least one pattern of interest in conjunction with at least one of the plurality of shots.

The coding feedback data 300 can be generated by video codec 103 in conjunction with either a decoding of the video signal 110, an encoding of the video signal 110 or a transcoding of the video signal 110. The video codec 103 can generate the shot transition data 152 based on image statistics group of picture data, etc. As discussed above, encoding preprocessing information, like variance and downscaled motion cost, can be used to generate shot transition data 152 for shot segmentation. Based on their historical tracks, if variance and downscaled motion cost change dramatically, an abrupt shot transitions happens; when variances keep changing monotonously and motion costs jump up and down at the start and end points of the monotonous variance changes, there is a gradual shot transition, like fade-in, fade-out, dissolve, and wipe. In decoding, frame reference information and bit consumption can be used similarly. The output shot transition data 152 can be used not only for GOP structure decision, mode selection and rate control to improve quality and performance in encoding, but also for temporal segmentation of the image sequence 310 and as an enabler for frame-rate invariant shot level searching features.

Further coding feedback data 300 can also be used by pattern detection module 175. The coding feedback data can include one or more image statistics and the pattern recognition module 175 can generate the pattern recognition data 156 based on these image statistics to identify features such as faces, text, human actions, as well as other objects and features. As discussed in conjunction with FIG. 1, temporal and spatial information used by video codec 103 to remove redundancy can also be used by pattern detection module 175 to detect or recognize features like sky, grass, sea, wall, buildings, moving vehicles and animals (including people). Temporal feedback in the form of motion vectors estimated in encoding or retrieved in decoding (or motion information gotten by optical flow for very low resolution) can be used by pattern detection module 175 for motion-based pattern partition or recognition via a variety of moving group algorithms. Spatial information such as statistical information, like variance, frequency components and bit consumption estimated from input YUV or retrieved for input streams, can be used for texture based pattern partition and recognition by a variety of different classifiers. More recognition features, like structure, texture, color and motion characters can be used for precise pattern partition and recognition. For instance, line structures can be used to identify and characterize manmade objects such as building and vehicles. Random motion, rigid motion and relative position motion are effective to discriminate water, vehicles and animal respectively.

In addition to analysis of static images included in the shot data 154, shot data 154 can includes a plurality of images in the image sequence 31, and the pattern detection module 175 can generate the pattern recognition data 156 based on a temporal recognition performed over a plurality of images within a shot. Slight motion within a shot and aggregation of images over a plurality of shots can enhance the resolution of the images for pattern analysis, can provide three-dimensional data from differing perspectives for the analysis and recognition of three-dimensional objects and other motion can aid in recognizing objects and other features based on the motion that is detected.

Pattern detection module 175 generates the pattern feedback data 298 as described in conjunction with FIG. 3 or other pattern recognition feedback that can be used by the video codec 103 in conjunction with the processing of video signal 110 into processed video signal 112. The operation of the pattern detection module 175 can be described in conjunction with the following additional examples.

In an example of operation, the video processing system 102 is part of a web server, teleconferencing system security system or set top box that generates indexing data 115 with facial recognition. The pattern detection module 175 operates based on coding feedback 300 that include motion vectors estimated in encoding or retrieved in decoding (or motion information gotten by optical flow etc. for very low resolution), together with a skin color model used to roughly partition face candidates. The pattern detection module 175 tracks a candidate facial region over the plurality of images and detects a face in the image based on the one or more of these images. Shot transition data 152 in coding feedback 300 can be used to start a new series of face detecting and tracking.

For example, pattern detection module 175 can operate via detection of colors in image sequence 310. The pattern detection module 175 generates a color bias corrected image from image sequence 310 and a color transformed image from the color bias corrected image. Pattern detection module 175 then operates to detect colors in the color transformed image that correspond to skin tones. In particular, pattern detection module 175 can operate using an elliptic skin model in the transformed space such as a $C_bC_r$ subspace of a transformed $YC_bC_r$ space. In particular, a parametric ellipse corresponding to contours of constant Mahalanobis distance can be constructed under the assumption of Gaussian skin tone distribution to identify a detected region 322 based on a two-dimension projection in the $C_bC_r$ subspace. As exemplars, the 853,571 pixels corresponding to skin patches from the Heinrich-Hertz-Institute image database can be used for this purpose, however, other exemplars can likewise be used in broader scope of the present invention.

In an embodiment, the pattern detection module 175 tracks a candidate facial region over the plurality of images and detects a facial region based on an identification of facial motion in the candidate facial region over the plurality of images, wherein the facial motion includes at least one of: eye movement; and the mouth movement. In particular, face candidates can be validated for face detection based on the further recognition by pattern detection module 175 of facial features, like eye blinking (both eyes blink together, which discriminates face motion from others; the eyes are symmetrically positioned with a fixed separation, which provides a means to normalize the size and orientation of the head.), shape, size, motion and relative position of face, eyebrows, eyes, nose, mouth, cheekbones and jaw. Any of these facial features can be used extracted from the shot data 154 and used by pattern detection module 175 to eliminate false detections. Further, the pattern detection module 175 can employ temporal recognition to extract three-dimensional features based on different facial perspectives included in the plurality of images to improve the accuracy of the recognition of the face.

Using temporal information, the problems of face detection including poor lighting, partially covering, size and posture sensitivity can be partly solved based on such facial tracking. Furthermore, based on profile view from a range of viewing angles, more accurate and 3D features such as contour of eye sockets, nose and chin can be extracted.

In addition to generating pattern recognition data 156 for indexing, the pattern recognition data 156 that indicates a face has been detected and the location of the facial region can also be used as pattern recognition feedback 298. The pattern recognition data 156 can include facial characteristic data such as position in stream, shape, size and relative position of face, eyebrows, eyes, nose, mouth, cheekbones and jaw, skin texture and visual details of the skin (lines, patterns, and spots apparent in a person's skin), or even enhanced, normalized and compressed face images. In response, the encoder section 236 can guide the encoding of the image sequence based on the location of the facial region. In addition, pattern recognition feedback 298 that includes facial information can be used to guide mode selection and bit allocation during encoding. Further, the pattern recognition data 156 and pattern recognition feedback 298 can further indicate the location of eyes or mouth in the facial region for use by the encoder section 236 to allocate greater resolution to these important facial features. For example, in very low bit rate cases the encoder section 236 can avoid the use of inter-mode coding in the region around blinking eyes and/or a talking mouth, allocating more encoding bits should to these face areas.

In a further example of operation, the video processing system 102 is part of a web server, teleconferencing system security system or set top box that generates indexing data 115 with text recognition. In this fashion, text data such as automobile license plate numbers, store signs, building names, subtitles, name tags, and other text potions in the image sequence 310 can be detected and recognized. Text regions typically have obvious features that can aid detection and recognition. These regions have relatively high frequency; they are usually have high contrast in a regular shape; they are usually aligned and spaced equally; they tend to move with background or objects.

Coding feedback 300 can be used by the pattern detection module 175 to aid in detection. For example, shot transition data from encoding or decoding can be used to start a new series of text detecting and tracking. Statistical information, like variance, frequency component and bit consumption, estimated from input YUV or retrieved from input streams can be used for text partitioning. Edge detection, YUV projection, alignment and spacing information, etc. can also be used to further partition interest text regions. Coding feedback data 300 in the form of motion vectors can be retrieved for the identified text regions in motion compensation. Then reliable structural features, like lines, ends, singular points, shape and connectivity can be extracted.

In this mode of operation, the pattern detection module 175 generates pattern recognition data 156 that can include an indication that text was detected, a location of the region of text and indexing data 115 that correlates the region of text to a corresponding video shots. The pattern detection module 175 can further operate to generate a text string by recognizing the text in the region of text and further to generate index data 115 that includes the text string correlated to the corresponding video shot. The pattern recognition module 175 can operate via a trained hierarchical and fuzzy classifier, neural network and/or vector processing engine to recognize text in a text region and to generate candidate text strings. These candidate text strings may optionally be modified later into final text by post processing or further offline analysis and processing of the shot data.

The pattern recognition data 156 can be included in pattern recognition feedback 298 and used by the encoder section 236 to guide the encoding of the image sequence. In this fashion, text region information can guide mode selection and rate control. For instance, small partition mode can be avoided in a small text region; motions vector can be grouped around text; and high quantization steps can be avoided in text regions, even in very low bit rate case to maintain adequate reproduction of the text.

In another example of operation, the video processing system 102 is part of a web server, teleconferencing system security system or set top box that generates indexing data 115 with recognition of human action. In this fashion and region of human action can be determined along with the determination of human action descriptions such as a number of people, body sizes and features, pose types, position, velocity and actions such as kick, throw, catch, run, walk, fall down, loiter, drop an item, etc. can be detected and recognized.

Coding feedback 300 can be used by the pattern detection module 175 to aid in detection. For example, shot transition data from encoding or decoding can be used to start a new series of action detecting and tracking. Motion vectors from encoding or decoding (or motion information gotten by optical flow etc. for very low resolution) can be employed for this purpose.

In this mode of operation, the pattern detection module 175 generates pattern recognition data 156 that can include an indication that human was detected, a location of the region of the human and indexing data 115 that includes, for example human action descriptors and correlates the human action to a corresponding video shot. The pattern detection module 175 can subdivide the process of human action recognition into: moving object detecting, human discriminating, tracking, action understanding and recognition. In particular, the pattern detection module 175 can identify a plurality of moving objects in the plurality of images. For example, motion objects can be partitioned from background. The pattern detection module 175 can then discriminate one or more humans from the plurality of moving objects. Human motion can be non-rigid and periodic. Shape-based features, including color and shape of face and head, width-height-ratio, limb positions and areas, tile angle of human body, distance between feet, projection and contour character, etc. can be employed to aid in this discrimination. These shape, color and/or motion features can be recognized as corresponding to human action via a classifier such as neural network. The action of the human can be tracked over the images in a shot and a particular type of human action can be recognized in the plurality of images. Individuals, presented as a group of corners and edges etc., can be precisely tracked using algorithms such as model-based and active contour-based algorithm. Gross moving information can be achieved via a Kalman filter or other filter techniques. Based on the tracking information, action recognition can be implemented by Hidden Markov Model, dynamic Bayesian networks, syntactic approaches or via other pattern recognition algorithm.

The pattern recognition data 156 can be included in pattern recognition feedback 298 and used by the encoder section 236 to guide the encoding of the image sequence. In this fashion, presence and location of human action can guide mode selection and rate control. For instance, inside a shot, moving prediction information, trajectory analysis or other human action descriptors generated by pattern detection module 175 and output as pattern recognition feedback 298 can assist the video codec 103 in motion estimation in encoding.

Figure 5:
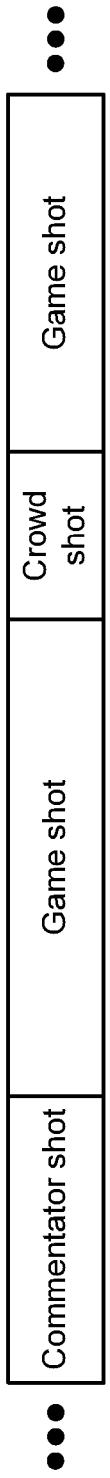
FIG. 5 presents a temporal block diagram representation of shot data 154 in accordance with a further embodiment of the present invention.

FIG. 5 presents a temporal block diagram representation of shot data 154 in accordance with a further embodiment of the present invention. In the example, presented a video signal 110 includes an image sequence 310 of a sporting event such as a football game that is processed by shot segmentation module 150 into shot data 154. Coding feedback data 300 from the video codec 103 includes shot transition data that indicates which images in the image sequence fall within which of the four shots that are shown. A first shot in the temporal sequence is a commentator shot, the second and fourth shots are shots of the game and the third shot is a shot of the crowd.

Figure 6:
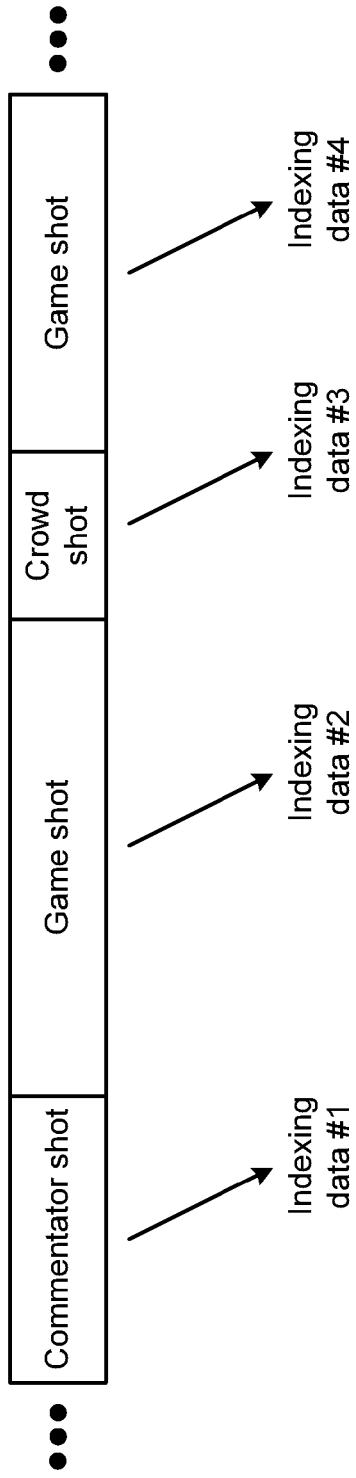
FIG. 6 presents a temporal block diagram representation of shot data 154 in accordance with a further embodiment of the present invention.

FIG. 6 presents a temporal block diagram representation of shot data 154 in accordance with a further embodiment of the present invention. Following with the example of FIG. 5, the pattern detection module 175 analyzes the shot data 154 in the four shots, based on the images included in each of the shots as well as temporal and spatial coding feedback data 300 from video codec 103 to recognize the first shot as being a commentator shot, the second and fourth shots as being shots of the game and the third shot is being a shot of the crowd.

The pattern detection module 175 generates pattern recognition data 156 in conjunction with each of the shots that identifies the first shot as being a commentator shot, the second and fourth shots as being shots of the game and the third shot is being a shot of the crowd. The pattern recognition data 156 is correlated to the shot transition data 152 to identify the location of each shot in the image sequence 310 and to identify each shot with the corresponding pattern recognition data 156, an optionally to identify a region within the shot by image and/or within one or more images that include the identified subject matter.

Figures 7, 8:
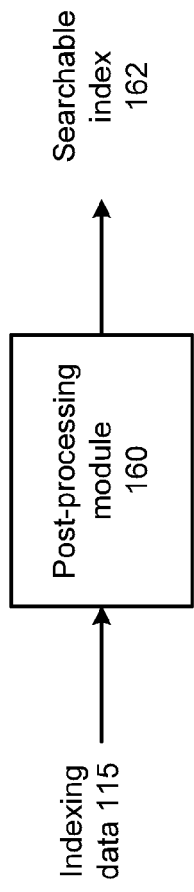
FIG. 7 presents a block diagram representation of a post-processing module 160 in accordance with a further embodiment of the present invention.
FIG. 8 presents a tabular representation of a searchable index 162 in accordance with a further embodiment of the present invention.

FIG. 7 presents a block diagram representation of a post-processing module 160 in accordance with a further embodiment of the present invention. In particular, a post processing module 160 is presented that further processes the indexing data 115 into generate a searchable index 162. In an embodiment, post processing module 160 generates the searchable index 162 from the index data 115 by correlating common content from the plurality of shots. Considering the example presented in conjunction with FIG. 6, the second and fourth shots would be matched together as both being game shots and placed in a hierarchical structure that under a common label, but preserving the range of images corresponding to each of the shots.

In a further embodiment, post processing module could process the pattern recognition data 156 to provide further pattern recognition capabilities. Consider an example in conjunction with FIG. 6, where the video signal is received by video processing system 102 in the form of a digital video recorder (DVR) at a user's home. The video signal 110 is processed by the DVR to generate processed video signal 112 for storage on the internal hard drive of the device for later playback. Indexing data 115 is generated by the video processing system 102 in conjunction with the storage of the processed video signal. In addition, the DVR sends the indexing data 115 to the post processing module 160 that is either local to the DVR or implemented in a remote server that is accessed by the DVR via the Internet or other network connection.

The post processing module 160 analyzes the indexing data 115 optionally included with the processed video signal 112 on a non-real-time basis to generate the searchable index 162 and optionally additional indexing based on further pattern recognition. In this fashion, the searchable index 162 can optionally perform additional pattern recognition to identify celebrities or other persons in the shots, specific buildings, text, products, venues, of a type and/or in regions of interest identified by the pattern recognition data 156. The searchable index data 162 is stored on either the remote server or on the DVR itself to allow a user, via a search feature of the DVR or server to locate and access portions of the stored video recording that contain features, such as shots that include scoring, shots with particular people, shots with particular objects or venues, etc.

In another example in conjunction with FIG. 6, the video signal is received by video processing system 102 in the form of a codec implemented via a network server as part of the encoding performed to upload a video to a social media website such as YouTube or Facebook, etc. The video signal 110 is processed by the codec to generate processed video signal 112 for storage on the server for later playback by the user or other users. Indexing data 115 is generated by the video processing system 102 in conjunction with the storage of the processed video signal. In addition, the server sends the indexing data 115 to a post processing module 160 that is either local to the server or implemented in a remote server that is accessed by the server via the Internet or other network connection. The post processing module 160 analyzes the indexing data 115 optionally included with the processed video signal 112 on a non-real-time basis to generate the searchable index 162 and optionally additional indexing based on further pattern recognition. As in the prior example, the searchable index 162 can optionally perform additional pattern recognition to identify celebrities or other persons in the shots, specific buildings, text, products, venues, of a type and/or in regions of interest identified by the pattern recognition data 156. The searchable index data 162 is stored on either the server or on a remote server to allow users, via a search feature, to locate and access portions of the stored video recording that contain features, such as shots that include scoring, shots with particular people, shots with particular objects or venues, etc.

FIG. 8 presents a tabular representation of a searchable index 162 in accordance with a further embodiment of the present invention. In another example in conjunction with FIGS. 6 & 7, a searchable index 162 is presented in tabular form where crowd shots and game shots are placed in an index structure under common labels. The range of images corresponding to each of the shots is indicated by a corresponding address range that can be used to quickly locate a particular shot or set of shots within a video.

Figure 9:
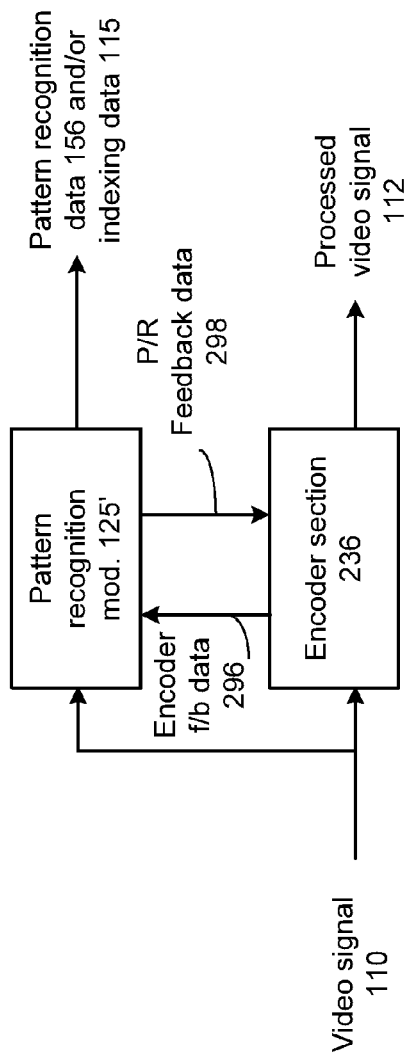
FIG. 9 presents a block diagram representation of a video processing system 102 in accordance with an embodiment of the present invention.

FIG. 9 presents a block diagram representation of a video processing system 102 in accordance with an embodiment of the present invention. In particular, a specific embodiment of video processing system 102 is shown where pattern recognition module 125' operates in a similar fashion to pattern recognition module 125, but in conjunction encoder section 236 of video codec 103. In this embodiment, coding feedback 300 takes the form of encoder feedback 296 and pattern recognition feedback data 298 is used by encoder section 236 in the encoding of video signal 110 into processed video signal 112. The encoder section 236 generates the encoder feedback data 296 in conjunction with the encoding of the video signal 110.

In operation, the pattern recognition module 125' detects a pattern of interest in the image sequence 310 of video signal 110, based on encoder feedback data 296. The image sequence 310 can be extracted directly from video signal 110 or received via the encoder section 236 in conjunction with the processing of video signal 110 as presented in conjunction with FIG. 3. The pattern recognition module 125' generates the pattern recognition data 156 to indicate the pattern of interest. As previously discussed, the pattern of interest could be a face, text, human action, or a wide range of other features or objects.

In this embodiment, the encoder section 236 generates the processed video signal 112 based on pattern recognition feedback 296 that includes the pattern recognition data 156. In particular, the encoder section 235 guides the encoding of the video signal 110 based on pattern recognition feedback 296 that indicates the pattern of interest was detected. For example, the pattern recognition feedback 296 can include region identification data that identifies a region of interest and the encoder section 236 can guide the encoding of the video signal 110 based on the region identification data.

As previously discussed, the encoder feedback data 296 includes shot transition data, such as shot transition data 152, that identifies temporal segments in the image sequence 310 corresponding to a plurality of video shots. The pattern recognition module 125' can generate the pattern recognition data 156 corresponding to at least one of the plurality of video shots. The shots can include a plurality of images of the image sequence 310 and the pattern recognition module 125' can generate the pattern recognition data 156 based on a temporal recognition performed over the plurality of images. Pattern recognition module 125' can further generate indexing data 115, in the form of pattern recognition data 156 that includes an identification of the pattern of interest and shot transition data 152 derived from encoding feedback data 296 or other data that includes an identification of at least one corresponding shot of the plurality of video shots that includes the pattern of interest.

Figure 10:
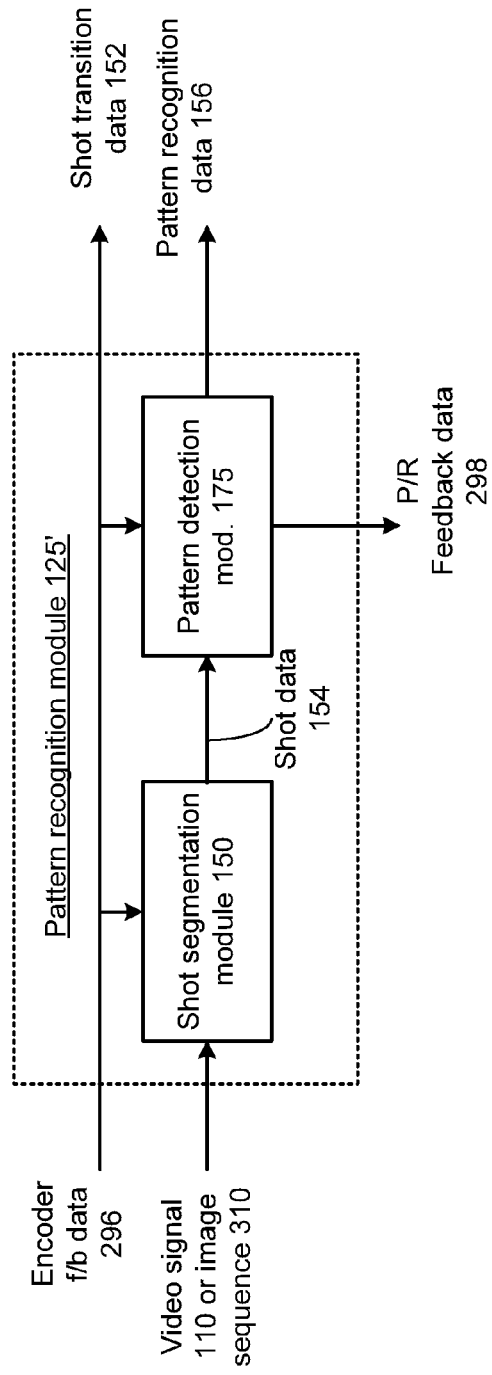
FIG. 10 presents a block diagram representation of a pattern recognition module 125' in accordance with a further embodiment of the present invention.

FIG. 10 presents a block diagram representation of a pattern recognition module 125' in accordance with a further embodiment of the present invention. Pattern recognition module 125' operates in a similar fashion to pattern recognition module 125 presented in conjunction with FIG. 4. The encoder feedback data 296 can include the same quantities described in conjunction with feedback data 300. In this embodiment shot segmentation module 150' operates in a similar fashion as shot segmentation module 150 to segment the image sequence 310 either directly or as extracted from the video signal 110. The pattern detection module 175 analyzes the shot data 154 generated by and generates pattern recognition data 156 that identifies at least one pattern of interest in conjunction with at least one of the plurality of shots.

Like coding feedback data 300, encoder feedback 296 can be generated by video encoder section 236 in conjunction with an encoding of the video signal 110 or a transcoding of the video signal 110. The video encoder section 236 can generate the shot transition data 152 based on image statistics, group of picture data, etc. As discussed above, encoding preprocessing information, like variance and downscaled motion cost, can be used to generate shot transition data 152 for shot segmentation. Based on their historical tracks, if variance and downscaled motion cost change dramatically, an abrupt shot transitions happens; when variances keep changing monotonously and motion costs jump up and down at the start and end points of the monotonous variance changes, there is a gradual shot transition, like fade-in, fade-out, dissolve, and wipe. The shot transition data 152 can be used not only for GOP structure decision, mode selection and rate control to improve quality and performance in encoding by video encoder section 236 but also output as a portion of encoder feedback data 296 for temporal segmentation of the image sequence 310 and as an enabler for frame-rate invariant shot level searching features.

Further encoder feedback 296 can also be used by pattern detection module 175. The coding feedback data can include one or more image statistics and the pattern recognition module 175 can generate the pattern recognition data 156 based on these image statistics to identify features such as faces, text, human actions, as well as other objects and features. As discussed in conjunction with FIG. 1, temporal and spatial information used by video codec 103 to remove redundancy can also be used by pattern detection module 175 to detect or recognize features like sky, grass, sea, wall, buildings, moving vehicles and animals (including people). Temporal feedback in the form of motion vectors estimated in encoding or retrieved in decoding (or motion information gotten by optical flow for very low resolution) can be used by pattern detection module 175 for motion-based pattern partition or recognition via a variety of moving group algorithms. Spatial information such as statistical information, like variance, frequency components and bit consumption estimated from input YUV or retrieved for input streams, can be used for texture based pattern partition and recognition by a variety of different classifiers. More recognition features, like structure, texture, color and motion characters can be used for precise pattern partition and recognition. For instance, line structures can be used to identify and characterize manmade objects such as building and vehicles. Random motion, rigid motion and relative position motion are effective to discriminate water, vehicles and animal respectively.

As previously discussed, in addition to analysis of static images included in the shot data 154, shot data 154 can include a plurality of images in the image sequence 310, and the pattern detection module 175 can generate the pattern recognition data 156 based on a temporal recognition performed over a plurality of images within a shot. Slight motion within a shot and aggregation of images over a plurality of shots can enhance the resolution of the images for pattern analysis, can provide three-dimensional data from differing perspectives for the analysis and recognition of three-dimensional objects and other motion can aid in recognizing objects and other features based on the motion that is detected.

Figure 11:
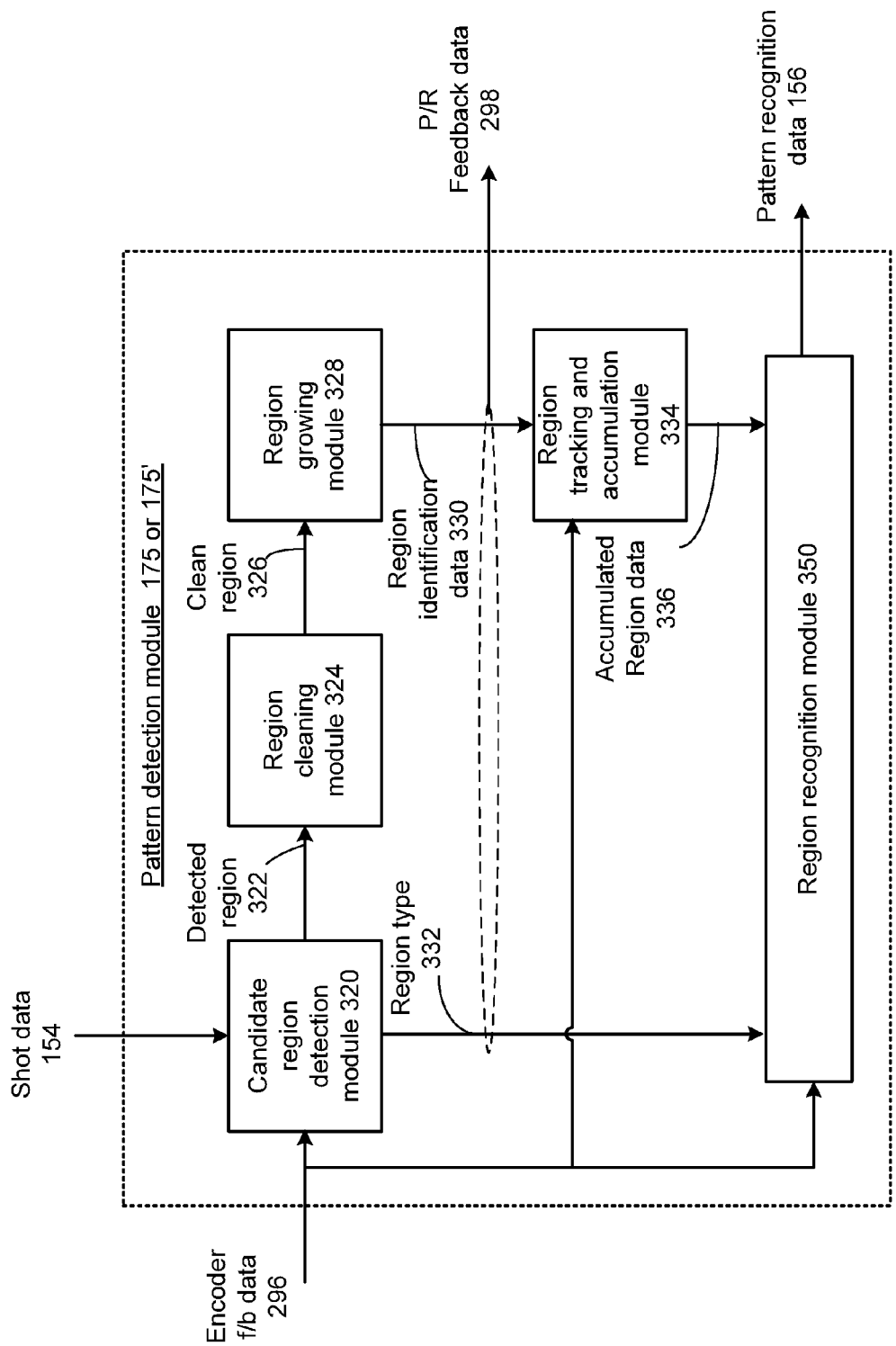
FIG. 11 presents a block diagram representation of a pattern detection module 175 or 175' in accordance with a further embodiment of the present invention.

FIG. 11 presents a block diagram representation of a pattern detection module 175 or 175' in accordance with a further embodiment of the present invention. In particular, pattern detection module 175 or 175' includes a candidate region detection module 320 for detecting a detected region 322 in at least one image of image sequence 310. In operation, the candidate region detection module 332 can detect the presence of a particular pattern or other region of interest to be recognized as a particular region type. An example of such a pattern is a human face or other face, human action, text, or other object or feature. Pattern detection module 175 or 175' optionally includes a region cleaning module 324 that generates a clean region 326 based on the detected region 322, such via a morphological operation. Pattern detection module 175 or 175' further includes a region growing module 328 that expands the clean region 326 to generate a region identification signal 330 that identifies the region containing the pattern of interest. The identified region type 332 and the region identification data can be output as pattern recognition feedback data 298.

Considering, for example, the case where the shot data 154 includes a human face and the pattern detection module 175 or 175' generates a region corresponding the human face, candidate region detection module 320 can generate detected region 322 based on the detection of pixel color values corresponding to facial features such as skin tones. Region cleaning module can generate a more contiguous region that contains these facial features and region growing module can grow this region to include the surrounding hair and other image portions to ensure that the entire face is included in the region identified by region identification signal 330.

As previously discussed, the encoder feedback data 296 includes shot transition data, such as shot transition data 152, that identifies temporal segments in the image sequence 310 that are used to bound the shot data 154 to a particular set of images in the image sequence 310. The candidate region detection module 320 further operates based on motion vector data to track the position of candidate region through the images in the shot data 154. Motion vectors, shot transition data and other encoder feedback data 296 are also made available to region tracking and accumulation module 334 and region recognition module 350. The region tracking and accumulation module 334 provides accumulated region data 336 that includes a temporal accumulation of the candidate regions of interest to enable temporal recognition via region recognition module 350. In this fashion, region recognition module 350 can generate pattern recognition data based on such features as facial motion, human actions, three-dimensional modeling and other features recognized and extracted based on such temporal recognition.

Figure 12:
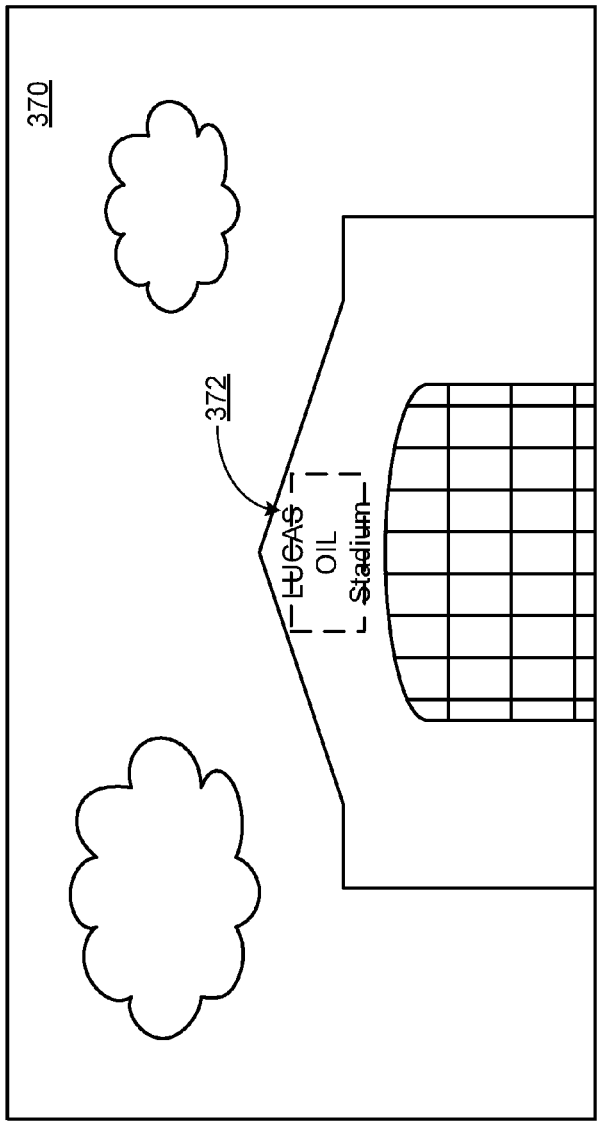
FIG. 12 presents a pictorial representation of an image 370 in accordance with a further embodiment of the present invention.

FIG. 12 presents a pictorial representation of an image 370 in accordance with a further embodiment of the present invention. In particular, an example image of image sequence 310 is shown that includes a portion of a particular football stadium as part of video broadcast of a football game. In accordance with this example, pattern detection module 175 or 175' generates region type data 332 included in both pattern recognition feedback data 298 and pattern recognition data 156 that indicates that text is present and region identification data 330 that indicates that region 372 that contains the text in this particular image. The pattern recognition module 350 operates based on this region 372 and optionally based on other accumulated regions that include this text to generate further pattern recognition data 156 that includes the recognized text string, "Lucas Oil Stadium".

Figure 13:
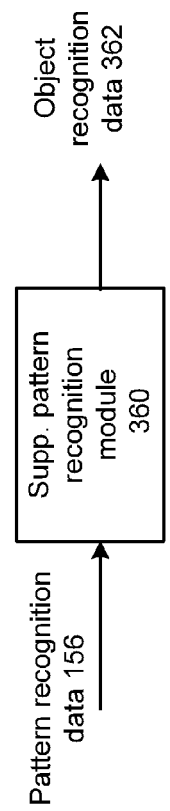
FIG. 13 presents a block diagram representation of a supplemental pattern recognition module 360 in accordance with an embodiment of the present invention.

FIG. 13 presents a block diagram representation of a supplemental pattern recognition module 360 in accordance with an embodiment of the present invention. While the embodiment of FIG. 12 is described based on recognition of the text string "Lucas Oil Stadium" via the operation of pattern recognition module 350, in another embodiment, the pattern recognition data 156 generated by pattern detection module 175 could merely include pattern descriptors, regions types and region data for off-line recognition into feature/object recognition data 362 via supplemental recognition module 360. In an embodiment, the supplemental recognition module 360 implements one or more pattern recognition algorithms. While described above in conjunction with the example of FIG. 12, the supplemental recognition module 360 can be used in conjunction with any of the other examples previously described to recognize a face, a particular person, a human actions, or other features/objects indicated by pattern recognition data 156. In effect, the functionality of pattern recognition module 350 is included in the supplemental recognition module 360, rather than in pattern detection module 175 or 175'.

The supplemental recognition module 360 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. Such a memory may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the supplemental recognition module 360 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 14:
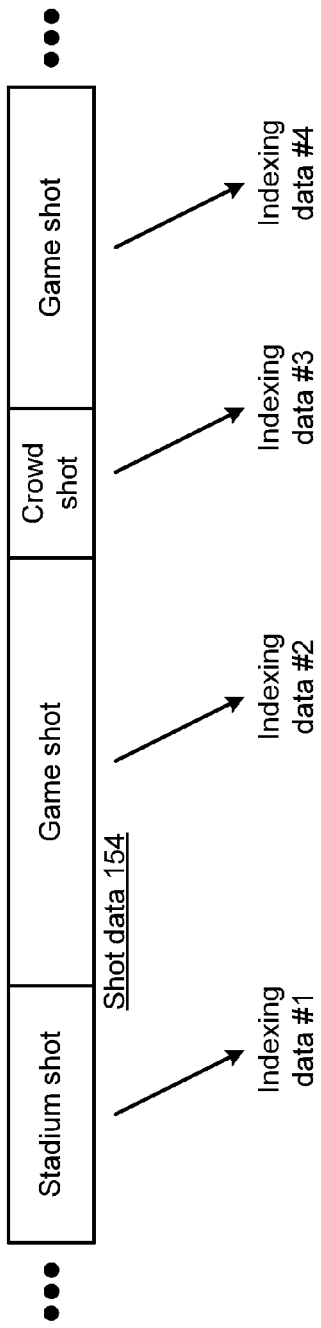
FIG. 14 presents a temporal block diagram representation of shot data 154 in accordance with a further embodiment of the present invention.

FIG. 14 presents a temporal block diagram representation of shot data 154 in accordance with a further embodiment of the present invention. In particular, various shots of shot data 154 are shown in conjunction with the video broadcast of a football game described in conjunction with FIG. 12. The first shot shown is a stadium shot that include the image 370. The indexing data corresponding to this shot includes an identification of the shot as a stadium shot as well as the text string "Lucas Oil Stadium". The other indexing data indicates the second and fourth shots as being shots of the game and the third shot is being a shot of the crowd.

A previously discussed, the indexing data generated in this fashion could be used to generate a searchable index of this video along with other video as part of a video search system. A user of the video processing system 102 could search videos for "Lucas Oil Stadium" and not only identify the particular video broadcast, but also identify the particular shot or shots within the video, such as the shot containing image 370, that contain a text region, such as text region 372 that generated the search string "Lucas Oil Stadium".

Figure 15:
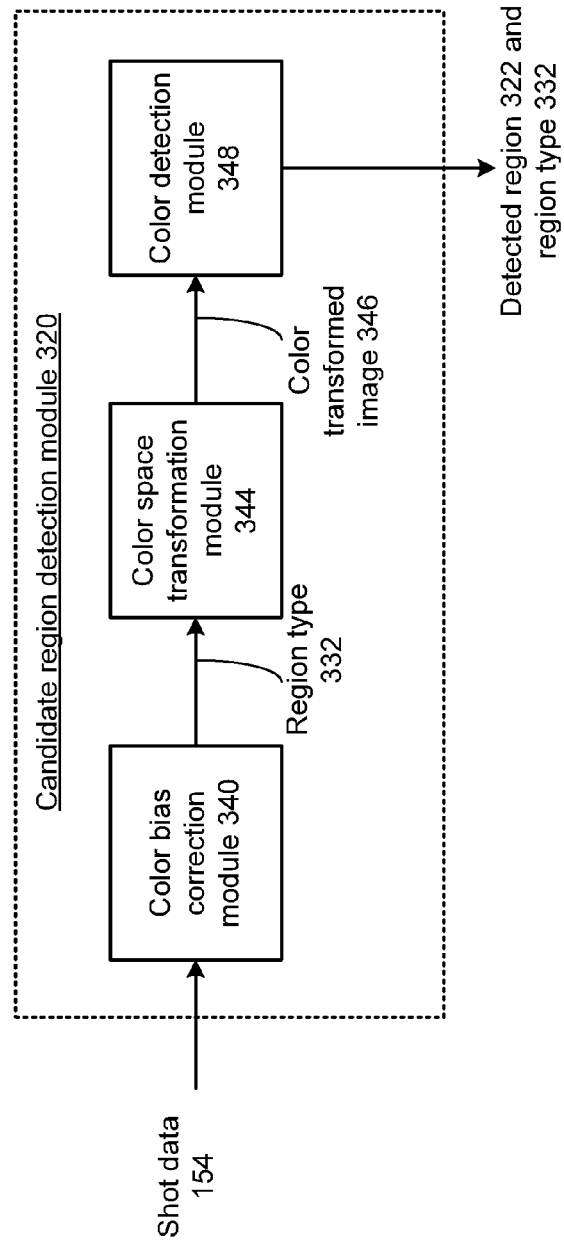
FIG. 15 presents a block diagram representation of a candidate region detection module 320 in accordance with a further embodiment of the present invention.

FIG. 15 presents a block diagram representation of a candidate region detection module 320 in accordance with a further embodiment of the present invention. In this embodiment, region detection module 320 operates via detection of colors in image 310. Color bias correction module 340 generates a color bias corrected image 342 from image 310. Color space transformation module 344 generates a color transformed image 346 from the color bias corrected image 342. Color detection module generates the detected region 322 from the colors of the color transformed image 346.

For instance, following with the example discussed in conjunction with FIG. 3 where human faces are detected, color detection module 348 can operate to detect colors in the color transformed image 346 that correspond to skin tones using an elliptic skin model in the transformed space such as a $C_b C_r$ subspace of a transformed $YC_b C_r$ space. In particular, a parametric ellipse corresponding to contours of constant Mahalanobis distance can be constructed under the assumption of Gaussian skin tone distribution to identify a detected region 322 based on a two-dimension projection in the $C_b C_r$ subspace. As exemplars, the 853,571 pixels corresponding to skin patches from the Heinrich-Hertz-Institute image database can be used for this purpose, however, other exemplars can likewise be used in broader scope of the present invention.

Figure 16:
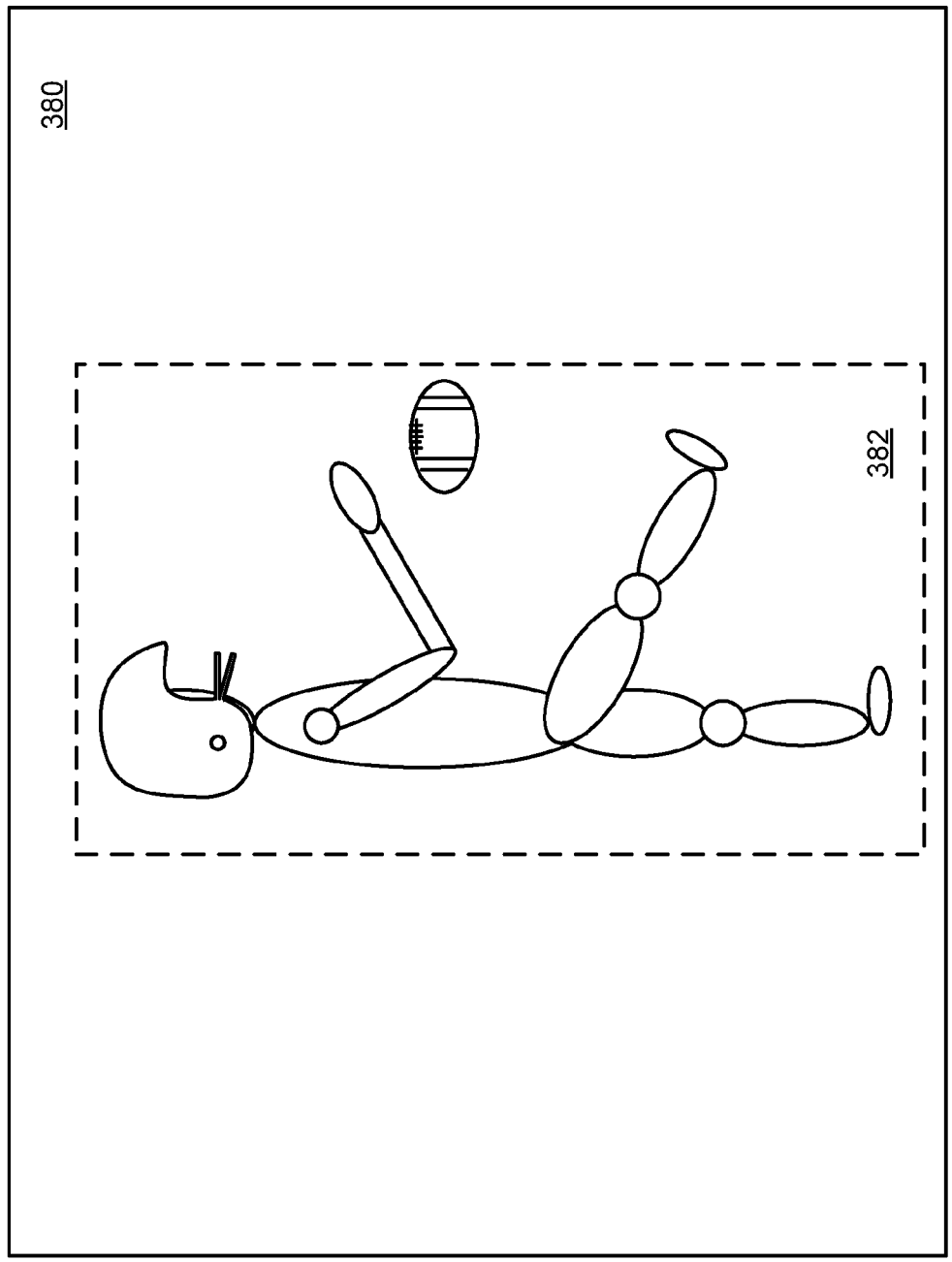
FIG. 16 presents a pictorial representation of an image 380 in accordance with a further embodiment of the present invention.

FIG. 16 presents a pictorial representation of an image 380 in accordance with a further embodiment of the present invention. In particular, an example image of image sequence 310 is shown that includes a player punting a football as part of video broadcast of a football game. In accordance with this example, pattern detection module 175 or 175' generates region type data 332 included in both pattern recognition feedback data 298 and pattern recognition data 156 that indicates that human action is present and region identification data 330 that indicates that region 382 that contains the human action in this particular image. The pattern recognition module 350 or supplemental pattern recognition module 360 operate based on this region 382 and based on other accumulated regions that include similar regions containing the punt to generate further pattern recognition data 156 that includes human action descriptors such as "football player", "kick", "punt" or other descriptors that characterize this particular human action.

Figure 17:
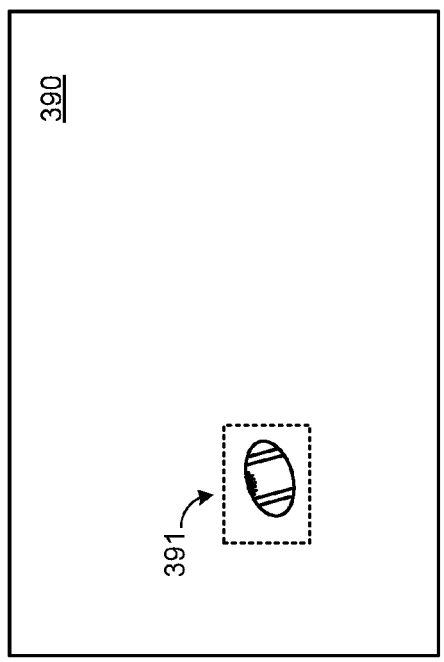
FIGS. 17-19 present pictorial representations of image 390, 392 and 395 in accordance with a further embodiment of the present invention.
Figure 18:
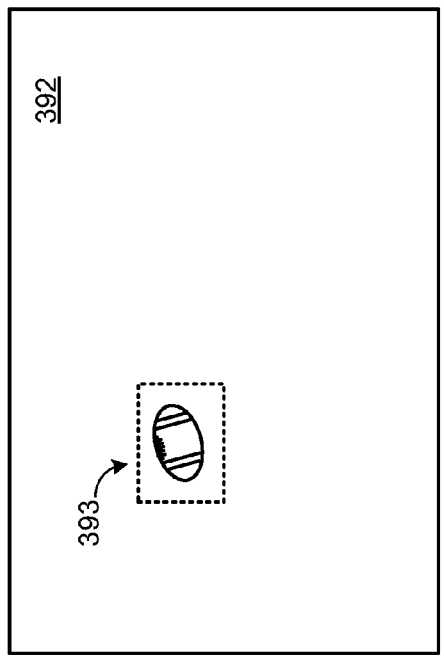
Figure 19:
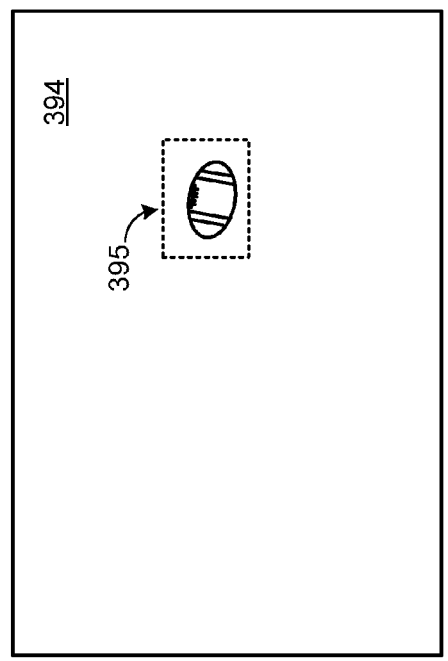

FIGS. 17-19 present pictorial representations of images 390, 392 and 395 in accordance with a further embodiment of the present invention. In particular, example images of image sequence 310 are shown that follow a punted a football as part of video broadcast of a football game. In accordance with this example, pattern detection module 175 or 175' generates region type data 332 included in both pattern recognition feedback data 298 and pattern recognition data 156 that indicates the presence of an object such as a football is present and region identification data 330 that indicates that regions 391, 393 and 395 contains the football in each corresponding images 390, 392 and 394.

The pattern recognition module 350 or supplemental pattern recognition module 360 operate based on accumulated regions 391, 393 and 395 that include similar regions containing the punt to generate further pattern recognition data 156 that includes human action descriptors such as "football play", "kick", "punt", information regarding the distance, height, trajectory of the ball and/or other descriptors that characterize this particular action.

It should be noted, that while the descriptions of FIGS. 9-19 have focused on an encoder section 236 that generates encoding feedback data 296 and the guides encoding based on pattern recognition data 298, similar techniques could likewise be used in conjunction with a decoder section 240 or transcoding performed by video codec 103 to generate coding feedback data 300 that is used by pattern recognition module 125 to generate pattern recognition feedback data that is used by the video codec 103 or decoder section 240 to guide encoding or transcoding of the image sequence.

Figure 20:
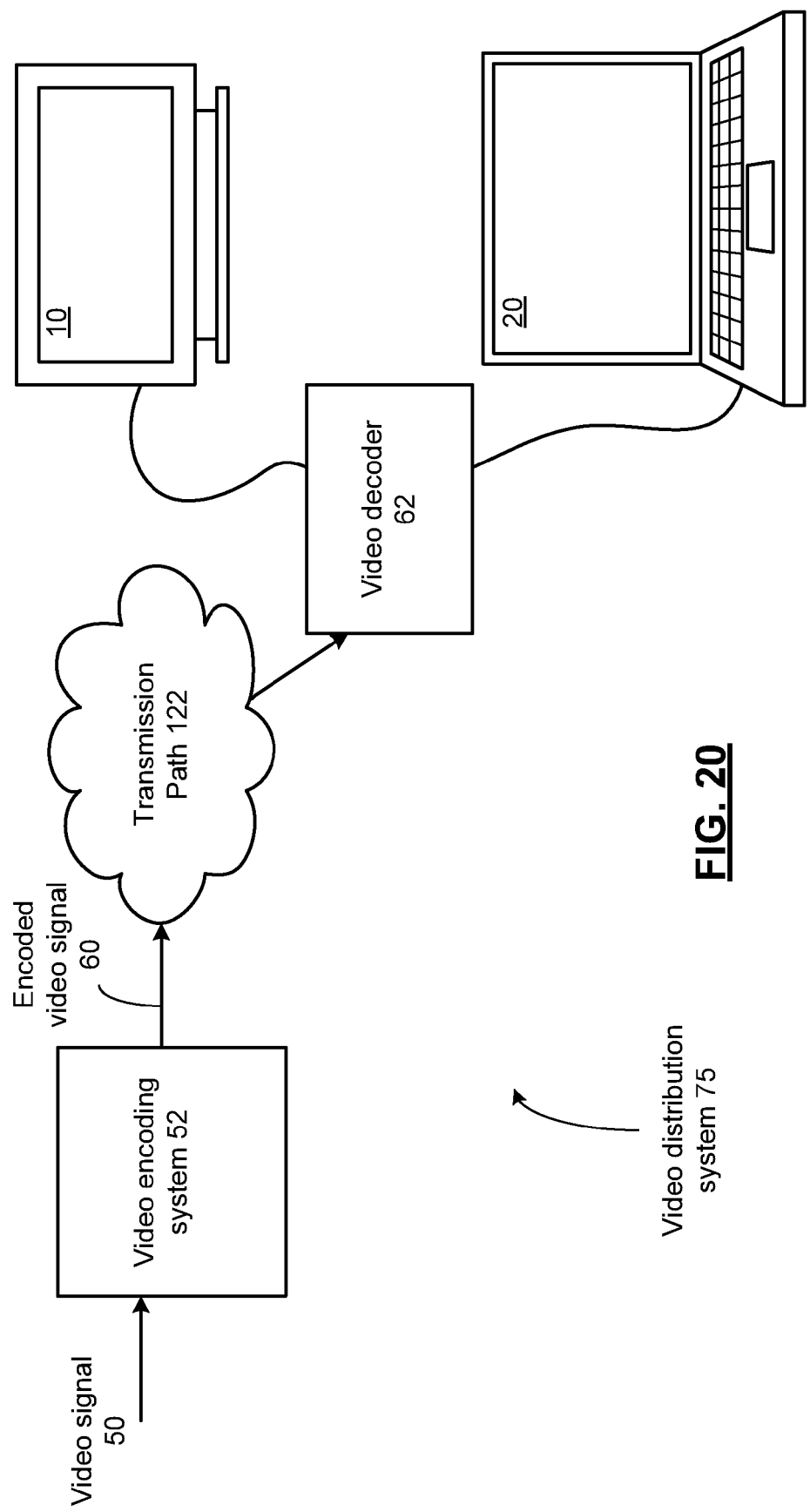
FIG. 20 presents a block diagram representation of a video distribution system 75 in accordance with an embodiment of the present invention.

FIG. 20 presents a block diagram representation of a video distribution system 75 in accordance with an embodiment of the present invention. In particular, a video signal 50 is encoded by a video encoding system 52 into encoded video signal 60 for transmission via a transmission path 122 to a video decoder 62. Video decoder 62, in turn can operate to decode the encoded video signal 60 for display on a display device such as television 10, computer 20 or other display device. The video processing system 102 can be implemented as part of the video encoder 52 or the video decoder 62 to generate pattern recognition data 156 and/or indexing data 115 from the content of video signal 50.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 21:
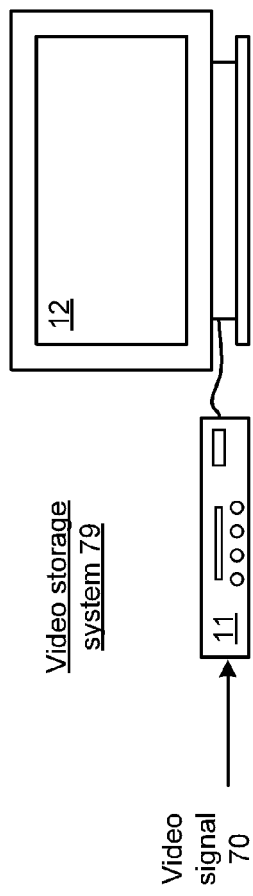
FIG. 21 presents a block diagram representation of a video storage system 79 in accordance with an embodiment of the present invention.

FIG. 21 presents a block diagram representation of a video storage system 79 in accordance with an embodiment of the present invention. In particular, device 11 is a set top box with built-in digital video recorder functionality, a stand alone digital video recorder, a DVD recorder/player or other device that records or otherwise stores a digital video signal for display on video display device such as television 12. The video processing system 102 can be implemented in device 11 as part of the encoding, decoding or transcoding of the stored video signal to generate pattern recognition data 156 and/or indexing data 115.

While these particular devices are illustrated, video storage system 79 can include a hard drive, flash memory device, computer, DVD burner, or any other device that is capable of generating, storing, encoding, decoding, transcoding and/or displaying a video signal in accordance with the methods and systems described in conjunction with the features and functions of the present invention as described herein.

Figure 22:
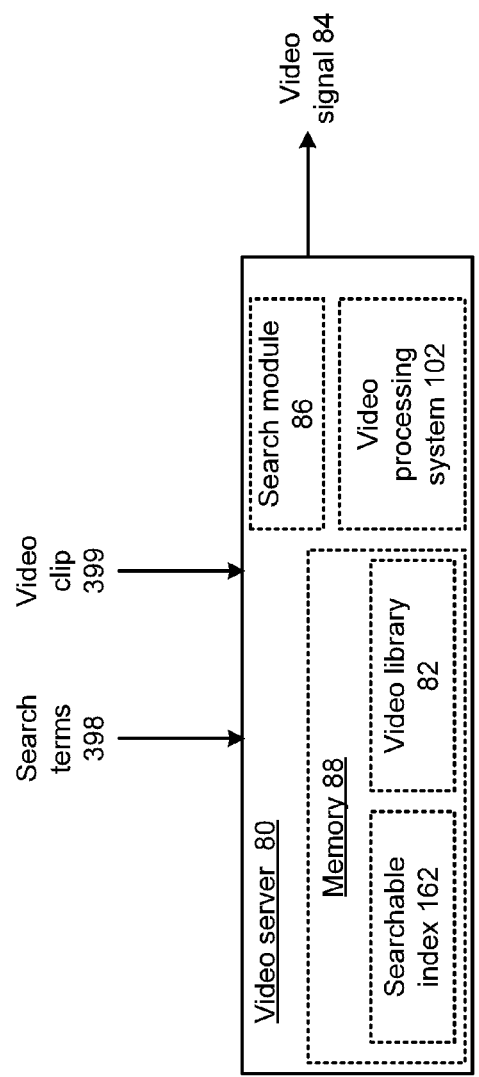
FIG. 22 presents a block diagram representation of a video server 80 in accordance with an embodiment of the present invention.

FIG. 22 presents a block diagram representation of a video server 80 in accordance with an embodiment of the present invention. Video system such as video server 80 implemented as a network server, web server or other network node or video system includes video processing system 102 that generates searchable index 162 in conjunction with the storage and/or transmission of the multiple video files or streams in video library 82. The video server 80 includes an interface such as a web interface implemented in conjunction with a user's browser. Users of the video server 80 can supply search terms 398 to identify videos and particular shots within the video content that include celebrities or other persons, specific buildings, text of interest, products, venues, particular human actions or other objects/features of interest. In this case, the search module 86 compares the search terms 398 to the searchable index to locate one or more matching video signals from the video library 82 that match the search terms 398. One or more of the matching video signals from the video library 82 can be selected by the user for streaming or download, based on the results of the searching, as the video signal 84.

For example, the video server 80 or other video system employs the video processing system 102 to generate a plurality of text strings that describe the videos of the video library 82 in conjunction with the encoding/decoding and/or transcoding these videos. A memory 88, coupled to the video processing system 102, stores a searchable index 162 that includes the plurality of text strings. The search module 86 identifies matching video from the video library 82 by comparing the search terms 398 or other input text strings to the plurality of text strings of the searchable index 162. Because the video processing system 102 generates the plurality of text strings to correspond to particular shots of the videos of video library 82, the search module 86 can further identify matching shots in the matching videos that contain the images that correspond to the search terms 398. In this fashion, a user can use search terms to search on particular, people, faces, text, human actions or other recognized objects, events, places or other things in the video library 82 and not only generate particular videos of the video library 82 that correspond to these search terms, but also be directed to the particular shot or shots in these matching videos that contain the recognized person, face, text, human action or other recognized object, event, place or other thing specified via the search terms 398.

In addition to searching based on text based search terms or other descriptors, the video server 80 also presents the option for users to search the video library 82 based on a video clip such as search clip 399. The search clip 399 may be of different resolution, bit-rate and frame-rate from the corresponding video in video library 82. The searchable index 162 can contain resolution invariant and bit-rate invariant frame-level searching features that can be correlated on a shot by shot basis to a shot or shots contained in search clip 399 in order to determine a level of correlation or match between the search clip 399 and one or more videos of the video library 82.

In an example of operation, the video processing system 102 generates the searchable index by processing video signals in the video library. The video processing system 102 generates hierarchical search features including frame level temporal and spatial information such as normalized variance such as the variance matrix of a single picture, changes in the variance matrix and trends throughout multiple pictures of a video, motion density and changes in motion density throughout a video, color information and changes in color information throughout a video, main part motions and bit consumption, etc. The hierarchical search features can further include shot-level features such as shot transition temporal intervals, shot motion, statistical features and developing features relating to shot segmentation. The search features are stored in the searchable index 162. In response to a search request, the video processing system 102 generates index data 115 in the form of similar hierarchical search features in conjunction with an input video clip 399 during frame-level or macroblock level decoding, encoding or transcoding. The search module 86 generates one or more matching videos from the video library 82 by matching the hierarchical search features from the video clip 399 to one or more corresponding features contained in the searchable index 162. Correlation can be compared on a shot by shot basis.

In this way video clips can be processed and searched based on their own search features in multiple layers in a search hierarchy. For instance, shot-level information can be used to preliminarily locate shots of potential interest and frame information can be used to further match potential shots corresponding to videos in the video library 82 to corresponding shots of the video clip 399. The search module locates a potential shot in the searchable index based on a comparison of at least one shot-level search feature of the video shot to a corresponding search feature in the searchable index. The search module then identifies the at least one matching video by comparing the frame level features to the corresponding features of the potential shot. The search module 86 can optionally allow a clip consisting of discontinuous shots of a video to be matched, based on this shot and frame level decomposition of hierarchical search features. While described in the example above in terms of a two level hierarchy with frame and segmentation levels, with alternative levels or one or more levels different from or in addition to those described above.

In an embodiment, the matching confidence level between the hierarchical search features of the video clip 399 and the corresponding features of the searchable index 162 can be generated for each of the search results that can be used to select search results for output, rank search results for the user to indicate most likely matches as well as to report the level of confidence with each matching video. The search module 86 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the search module 86 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The video library 82 and the searchable index 162 can be stored in a memory such as a hard disk drive or other disk drive, read-only memory, random access memory, volatile memory, non-volatile memory, static memory, dynamic memory, flash memory, cache memory, and/or any device that stores digital information.

FIG. 23 presents a flowchart representation of a method in accordance with an embodiment of the present invention. In particular a method is presented for use in conjunction with one more functions and features described in conjunction with FIGS. 1-22. In step 400, a processed video is generated via a video codec along with coding feedback data that includes shot transition data that identifies temporal segments in the image sequence corresponding to a plurality of video shots that each include a plurality of images in the image sequence. In step 402, the shot transition data is processed to segment the video signal into shot data corresponding to the plurality of shots, based on the coding feedback data. In step 404, the shot data is analyzed to generate pattern recognition data that identifies at least one pattern of interest in conjunction with at least one of the plurality of shots.

The coding feedback data can be generated in conjunction with at least one of: a decoding of the video signal, an encoding of the video signal and a transcoding of the video signal. The shot transition data can be generated based on at least one image statistic or based on group of picture data. The coding feedback data can include at least one image statistic and the pattern recognition data can be generated based on the at least one image statistic. At least one of the plurality of shots includes a plurality of images in the image sequence and the pattern recognition data can be generated based on a temporal recognition performed over the plurality of images.

FIG. 24 presents a flowchart representation of a method in accordance with an embodiment of the present invention. In particular a method is presented for use in conjunction with one more functions and features described in conjunction with FIGS. 1-23. In step 410, a searchable index is generated from the index data by correlating common content from the plurality of shots.

Figure 25:
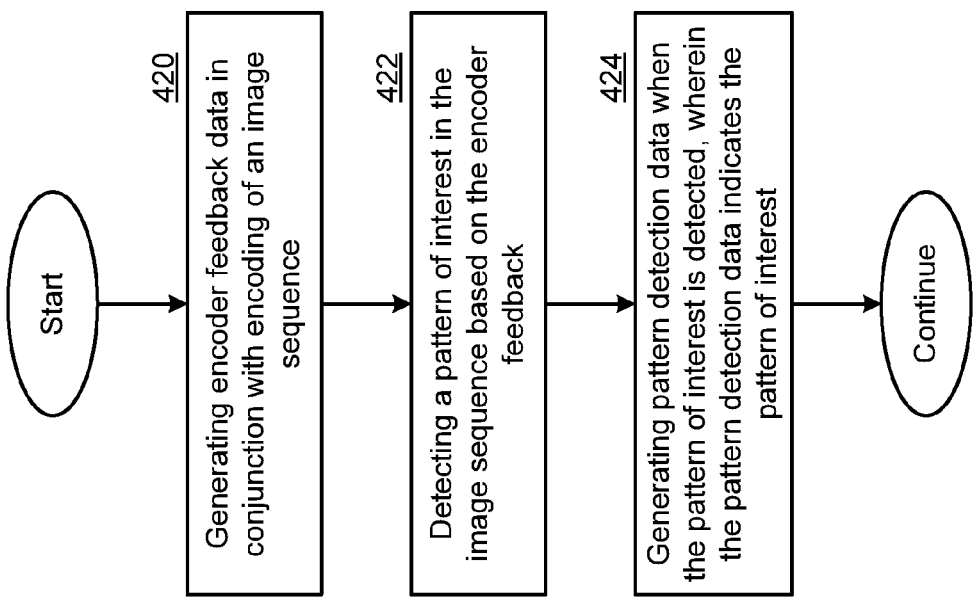
FIG. 25 presents a flowchart representation of a method in accordance with an embodiment of the present invention.

FIG. 25 presents a flowchart representation of a method in accordance with an embodiment of the present invention. In particular a method is presented for use in conjunction with one more functions and features described in conjunction with FIGS. 1-24. In step 420, encoder feedback data is generated in conjunction with the encoding of the image sequence via an encoder section. In step 422, a pattern of interest is detected in the image sequence, based on the encoder feedback data. In step 424, pattern recognition data is generated when the pattern of interest is detected, wherein the pattern recognition data indicates the pattern of interest.

In an embodiment, the processed video signal is generated based on pattern recognition feedback that includes the pattern recognition data. The pattern recognition data can include an identification of a pattern of interest and the encoding of the image sequence can be guided based on pattern recognition feedback that indicates the identification of the pattern of interest. The pattern recognition feedback can further include region identification data that identifies a region of interest and the encoding of the image sequence can be modified based on the region identification data.

The encoder feedback data can include shot transition data that identifies temporal segments in the image sequence corresponding to a plurality of video shots. The pattern recognition data can be generated to correspond to at least one of the plurality of video shots. At least one of the plurality of shots can include a plurality of images in the image sequence and the pattern recognition data can be generated based on a temporal recognition performed over the plurality of images.

Figure 26:
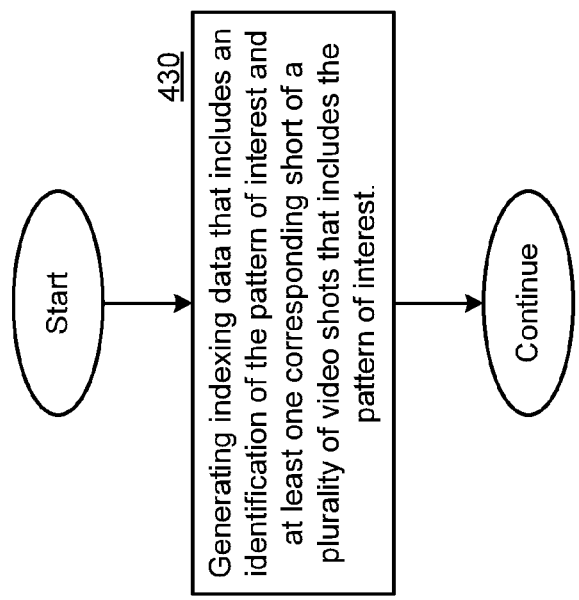
FIG. 26 presents a flowchart representation of a method in accordance with an embodiment of the present invention.

FIG. 26 presents a flowchart representation of a method in accordance with an embodiment of the present invention. In particular a method is presented for use in conjunction with one more functions and features described in conjunction with FIGS. 1-25. In step 430, indexing data is generated that includes an identification of the pattern of interest and an identification of at least one corresponding shot of the plurality of video shots that includes the pattern of interest.

Figure 27:
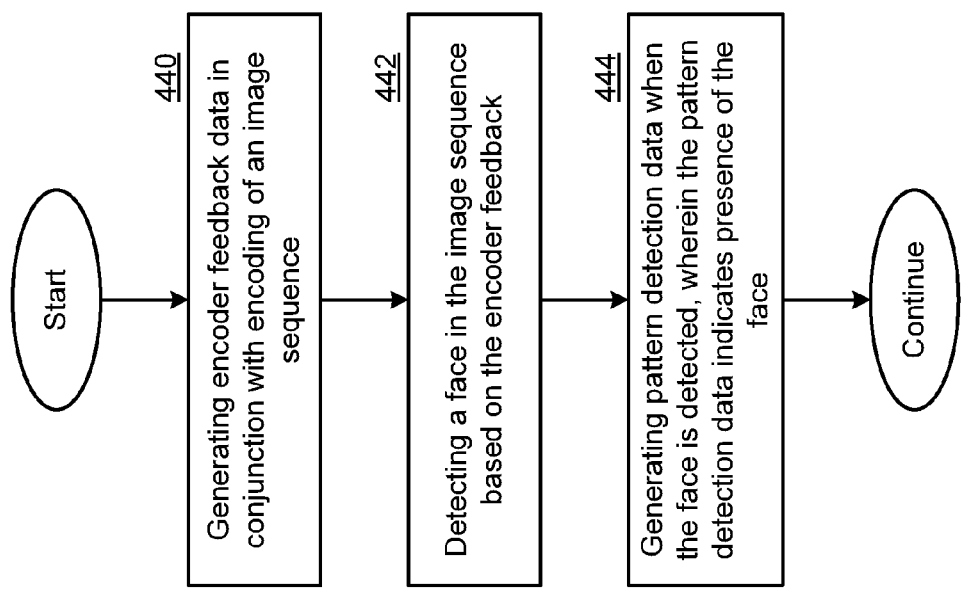
FIG. 27 presents a flowchart representation of a method in accordance with an embodiment of the present invention.

FIG. 27 presents a flowchart representation of a method in accordance with an embodiment of the present invention. In particular a method is presented for use in conjunction with one more functions and features described in conjunction with FIGS. 1-26. In step 440, encoder feedback data is generated in conjunction with the encoding of the image sequence via an encoder section. In step 442, a face is detected in the image sequence, based on the encoder feedback data. In step 444, pattern recognition data is generated when the face is detected, wherein the pattern recognition data indicates presence of the face.

In an embodiment, the encoder feedback data includes shot transition data that identifies temporal segments in the image sequence corresponding to a plurality of video shots. At least one of the plurality of shots can include a plurality of images in the image sequence and the pattern recognition data can be generated based on a temporal recognition performed over the plurality of images. Temporal recognition can tracks a candidate facial region over the plurality of images and detect a facial region based on an identification of facial motion in the candidate facial region over the plurality of images, wherein the facial motion includes at least one of: eye movement; and the mouth movement. The pattern recognition data can include pattern recognition feedback that indicates the location of the facial region, and the encoding of the image sequence can be guided based on the location of the facial region. The pattern recognition data can include pattern recognition feedback that further indicates the location of at least one of: eyes in the facial region; and a mouth in the facial region. Temporal recognition can track a candidate facial region over the plurality of images and extract three-dimensional features based on different facial perspectives included in the plurality of images. The encoder feedback data can includes at least one image statistic and/or motion vector data.

Figure 28:
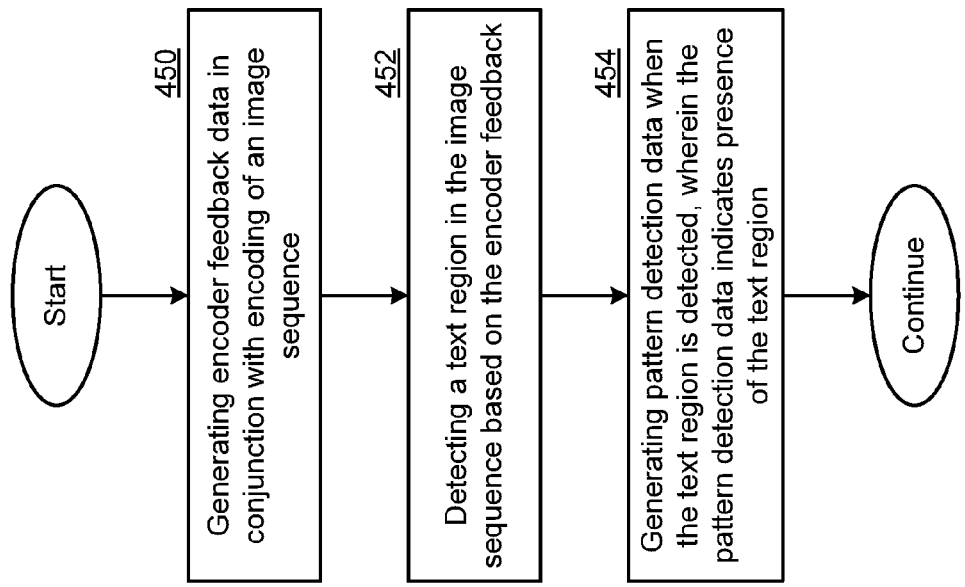
FIG. 28 presents a flowchart representation of a method in accordance with an embodiment of the present invention.

FIG. 28 presents a flowchart representation of a method in accordance with an embodiment of the present invention. In particular a method is presented for use in conjunction with one more functions and features described in conjunction with FIGS. 1-27. In step 450, encoder feedback data is generated in conjunction with the encoding of the image sequence via an encoder section. In step 452 a text region is detected in the image sequence, based on the encoder feedback data. In step 454, pattern recognition data is generated when the text region is detected, wherein the pattern recognition data indicates presence of the text region and the text string.

In an embodiment, the pattern recognition data includes a location of the region of text and the encoding of the image sequence is modified based on pattern recognition feedback that indicates the presence of text in at least one image and indicates the location of the region of text. The encoder feedback data can include at least one image statistic and/or motion vector data.

Figure 29:
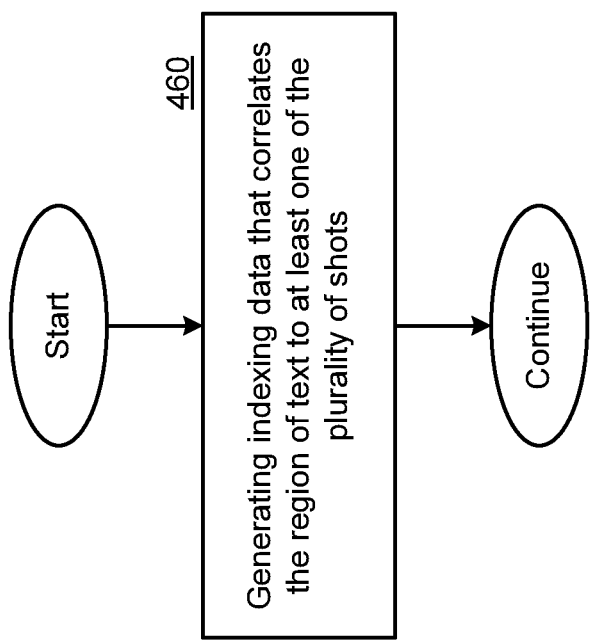
FIG. 29 presents a flowchart representation of a method in accordance with an embodiment of the present invention.

FIG. 29 presents a flowchart representation of a method in accordance with an embodiment of the present invention. In particular a method is presented for use in conjunction with one more functions and features described in conjunction with FIGS. 1-28 wherein the encoder feedback data includes shot transition data that identifies temporal segments in the image sequence corresponding to a plurality of video shots. In step 460, index data is generated that correlates the region of text to at least one of the plurality of video shots.

Figure 30:
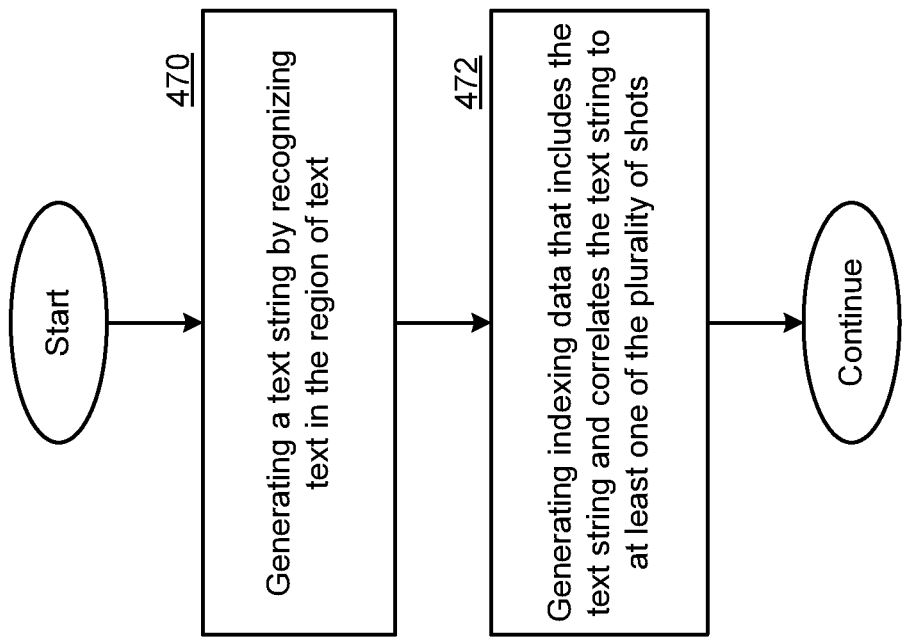
FIG. 30 presents a flowchart representation of a method in accordance with an embodiment of the present invention.

FIG. 30 presents a flowchart representation of a method in accordance with an embodiment of the present invention. In particular a method is presented for use in conjunction with one more functions and features described in conjunction with FIGS. 1-29. In step 470, a text string is generated by recognizing text in the region of text. In step 472, index data is generated that includes the text string and correlates the text string to at least one of the plurality of video shots.

FIG. 31 presents a flowchart representation of a method in accordance with an embodiment of the present invention. In particular a method is presented for use in conjunction with one more functions and features described in conjunction with FIGS. 1-30. In step 480, encoder feedback data is generated in conjunction with the encoding of the image sequence via an encoder section. In step 482, a region of human action is detected in the image sequence, based on the encoder feedback data. In step 484, pattern recognition data is generated when the region of human action is detected, wherein the pattern recognition data indicates presence of the region of human action.

In an embodiment, the pattern recognition data includes a location of the region of human action and the video encoder guides the encoding of the image sequence based on pattern recognition feedback that indicates the presence of human action in at least one image and indicates the location of the region of text. The encoder feedback data can include motion vector data.

FIG. 32 presents a flowchart representation of a method in accordance with an embodiment of the present invention. In particular a method is presented for use in conjunction with one more functions and features described in conjunction with FIGS. 1-31 wherein the encoder feedback data includes shot transition data that identifies temporal segments in the image sequence corresponding to a plurality of video shots that each include a plurality of images in the image sequence. In step 490, index data is generated that correlates the region and descriptor of human action to at least one of the plurality of video shots.

Figure 33:
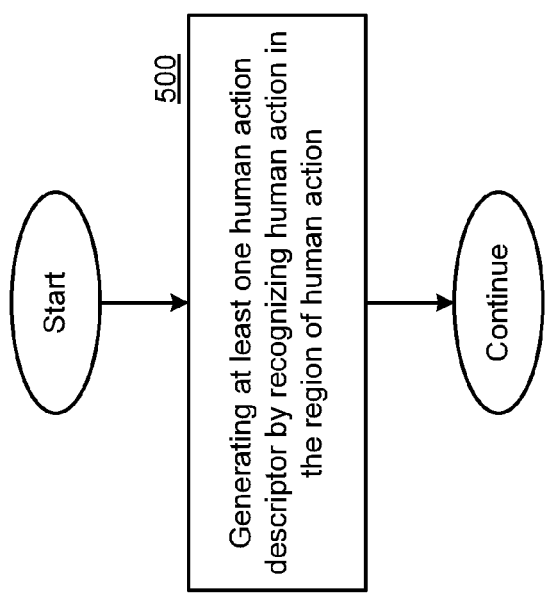
FIG. 33 presents a flowchart representation of a method in accordance with an embodiment of the present invention.

FIG. 33 presents a flowchart representation of a method in accordance with an embodiment of the present invention. In particular a method is presented for use in conjunction with one more functions and features described in conjunction with FIGS. 1-32. In step 500, at least one human action descriptor is generated by recognizing human action in the region of human action. The index data can include the at least one human action descriptor correlated to at least one of the plurality of video shots. These human action descriptors can be generated based on a temporal recognition performed over the plurality of images.

Figure 34:
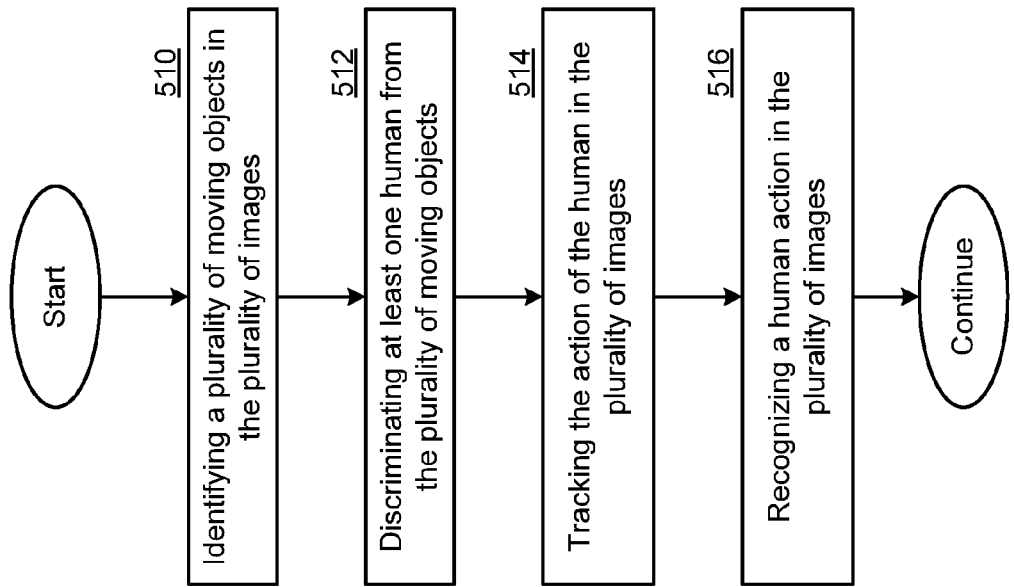
FIG. 34 presents a flowchart representation of a method in accordance with an embodiment of the present invention.

FIG. 34 presents a flowchart representation of a method in accordance with an embodiment of the present invention. In particular a method is presented for use in conjunction with one more functions and features described in conjunction with FIGS. 1-33. The human action descriptors are generated by: identifying a plurality of moving objects in the plurality of images in step 510, discriminating at least one human from the plurality of moving objects in step 512, tracking the action of the human in the plurality of images in step 514 and by recognizing a human action in the plurality of images as shown in step 516.

Figure 35:
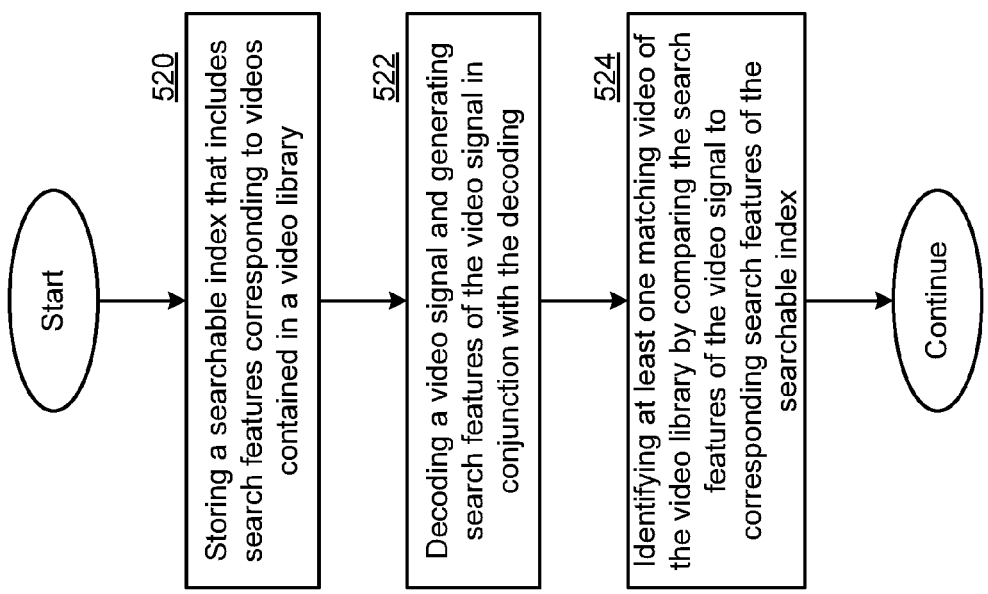
FIG. 35 presents a flowchart representation of a method in accordance with an embodiment of the present invention.

FIG. 35 presents a flowchart representation of a method in accordance with an embodiment of the present invention. In particular a method is presented for use in conjunction with one more functions and features described in conjunction with FIGS. 1-34. In step 520, a searchable index is stored that includes search features corresponding to videos contained in a video library. In step 522, a video signal is decoded and search features of the video signal are generated in conjunction with the decoding. In step 524, at least one matching video of the video library is identified by comparing the search features of the video signal to corresponding search features of the searchable index.

The search features can include at least one shot-level search feature and at least one frame level feature. Step 522 can include segmenting an image sequence of the video signal into shot data corresponding to a plurality of shots, and generating the shot-level search feature based on the shot data. The search features can include hierarchical search features. Step 524 can include locating a potential shot in the searchable index based on a comparison of at least one shot-level search feature of the video signal to a corresponding search feature in the searchable index. Step 524 can further include comparing the at least one frame level feature to the corresponding feature of the potential shot.

Figure 36:
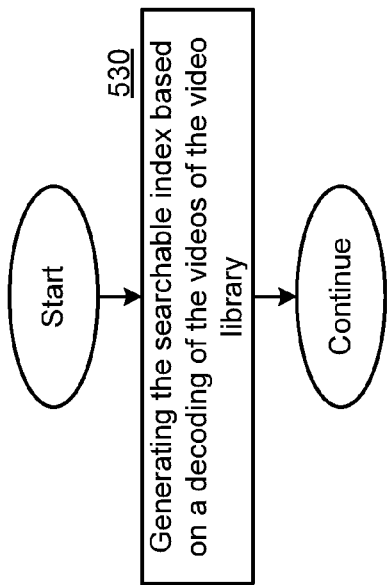
FIG. 36 presents a flowchart representation of a method in accordance with an embodiment of the present invention.

FIG. 36 presents a flowchart representation of a method in accordance with an embodiment of the present invention. In particular a method is presented for use in conjunction with one more functions and features described in conjunction with FIGS. 1-35. In step 530, the searchable index is generated based on a processing of the videos of the video library.

Figure 37:
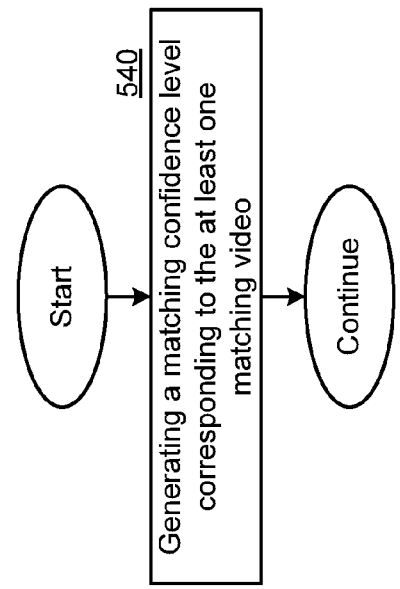
FIG. 37 presents a flowchart representation of a method in accordance with an embodiment of the present invention.

FIG. 37 presents a flowchart representation of a method in accordance with an embodiment of the present invention. In particular a method is presented for use in conjunction with one more functions and features described in conjunction with FIGS. 1-36. In step 540, a matching confidence level is generated corresponding to the at least one matching video.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A system for processing a video signal into a processed video signal, the video signal including an image sequence, the system comprising:
    a video codec that generates the processed video signal and that further generates coding feedback data, wherein the coding feedback data includes shot transition data generated as a byproduct of an encoding of the video signal based on picture variance and motion cost data generated as part of the encoding and wherein the shot transition data identifies temporal segments in the image sequence corresponding to a plurality of shots that each include a plurality of images in the image sequence, and wherein the video codec generates the shot transition data based on a first criteria of the picture variance and motion cost data to detect an abrupt shot transition and based on a second criteria of the picture variance and motion cost data to detect a gradual shot transition; and a pattern recognition module, coupled to the video codec, that generates index data corresponding to at least one of the plurality of shots, wherein the index data includes pattern recognition data having a text string that identifies a recognized pattern and an identification of the at least one of the plurality of shots.

2. The system of claim 1 wherein the pattern recognition module includes:

a shot segmentation module that segments the image sequence into shot data corresponding to the plurality of shots, based on the shot transition data; and a pattern detection module that analyzes the shot data and generates the pattern recognition data in conjunction with at least one of the plurality of shots.

3. The system of claim 1 wherein the pattern detection module generates the pattern recognition data in response to the recognition of at least one of: a face; text; and a human action.

4. The system of claim 1 wherein the at least one of the plurality of shots includes a plurality of images in the image sequence and wherein the pattern detection module generates the pattern recognition data based on a temporal recognition performed over the plurality of images.

5. The system of claim 1 further comprising a post processing module, coupled to the pattern recognition module that generates a searchable index from the index data by correlating common content from the plurality of shots.

6. A method for processing a video signal into a processed video signal, the video signal including an image sequence, the method comprising:

generating, via a video codec, the processed video signal and coding feedback data that includes shot transition data generated as a byproduct of an encoding of the video signal based on picture variance and motion cost data generated as part of the encoding, wherein the shot transition data identifies temporal segments in the image sequence corresponding to a plurality of video shots that each include a plurality of images in the image sequence, wherein the video codec generates the shot transition data based on a first criteria of the picture variance and motion cost data to detect an abrupt shot transition and based on a second criteria of the picture variance and motion cost data to detect a gradual shot transition;

processing the shot transition data to segment the video signal into shot data corresponding to the plurality of shots, based on the shot transition data;

analyzing the shot data to generate pattern recognition data that identifies at least one pattern of interest in conjunction with at least one of the plurality of shots; and generating index data includes the pattern recognition data having a text string that identifies a recognized pattern and an identification of the at least one of the plurality of shots.

7. The method of claim 6 wherein the shot transition data is generated further based on group of picture data.

8. The method of claim 6 wherein the pattern recognition data is generated in response to the recognition of at least one of: a face; text; and a human action.

9. The method of claim 6 wherein the at least one of the plurality of shots includes a plurality of images in the image sequence and wherein the pattern recognition data is generated based on a temporal recognition performed over the plurality of images.

10. The method of claim 6 further comprising:

generating a searchable index from the index data by correlating common content from the plurality of shots.

11. A system for searching at least one video signal based on an input text string, the system comprising:

a video processing system that includes a video codec that processes the at least one video signal and that further generates a plurality of text strings that describe the video signal based on image recognition performed based on shot transition data generated as a byproduct of an encoding of the at least one video signal based on picture variance and motion cost data generated as part of the encoding, wherein the video codec generates the shot transition data based on a first criteria of the picture variance and motion cost data to detect an abrupt shot transition and based on a second criteria of the picture variance and motion cost data to detect a gradual shot transition;

a memory, coupled to the video processing system, that stores a searchable index that includes the plurality of text strings; and a search module, coupled to the memory, that identifies at least one matching video of the at least one video signal by comparing the input text string to the plurality of text strings of the searchable index.

12. The system of claim 11 wherein the video processing system includes a shot segmentation module that segments the at least one video signal into shot data that includes a plurality of shots based on the shot transition data, and that generates the plurality of text strings to correspond to selected ones of the plurality of shots.

13. The system of claim 12 wherein the search module further identifies at least one matching shot of the at least one matching video.

14. The system of claim 11 wherein the at least one video signal includes a plurality of videos of a video library.

15. The system of claim 11 wherein the video processing system generates the plurality of text strings to describe at least one of: a person shown in the at least one video signal, text shown in the at least one video signal, and a human action shown in the at least one video signal.

* * * * *